(12) United States Patent
Lee et al.

(10) Patent No.: US 12,327,197 B2
(45) Date of Patent: Jun. 10, 2025

(54) SYSTEM AND METHOD FOR PROVIDING CONTENT BASED ON KNOWLEDGE GRAPH

(71) Applicant: SAMSUNG ELECTRONICS CO., LTD., Suwon-si (KR)

(72) Inventors: Jaehun Lee, Suwon-si (KR); Yunsu Lee, Suwon-si (KR); Taeho Hwang, Suwon-si (KR); Jungho Park, Suwon-si (KR); Mirae Jeong, Suwon-si (KR); Jiyoung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1049 days.

(21) Appl. No.: 16/654,584

(22) Filed: Oct. 16, 2019

(65) Prior Publication Data
US 2020/0118010 A1   Apr. 16, 2020

(30) Foreign Application Priority Data
Oct. 16, 2018  (KR) .................... 10-2018-0123272

(51) Int. Cl.
*G06N 5/025* (2023.01)
*G06N 20/20* (2019.01)

(52) U.S. Cl.
CPC ............. *G06N 5/025* (2013.01); *G06N 20/20* (2019.01)

(58) Field of Classification Search
CPC ................................ G06N 5/02; G06N 20/20
See application file for complete search history.

(56) References Cited

U.S. PATENT DOCUMENTS 9,178,933 B1   11/2015 Soland
10,223,417 B1 * 3/2019 Sirin .................. G06F 16/9024
(Continued)

FOREIGN PATENT DOCUMENTS

JP   2008-502079 A   1/2008
JP   2017-516245 A   6/2017
(Continued)

OTHER PUBLICATIONS

Communication dated Jul. 22, 2021 issued by the European Patent Office in application No. 19873945.0.
(Continued)

*Primary Examiner* — Alexey Shmatov
*Assistant Examiner* — Clint Mullinax
(74) *Attorney, Agent, or Firm* — Sughrue Mion, PLLC

(57) ABSTRACT

Provided are an artificial intelligence (AI) system using a machine learning algorithm and an application of the AI system. A device for providing content based on a knowledge graph includes: a memory storing instructions; and a processor configured to execute the instructions to: obtain context information related to the device; obtain a first device knowledge graph of a user of the device by inputting the obtained context information to a first AI model for determining a relation between entities related to the user of the device; request, from a server, a server knowledge graph generated by the server; receive the server knowledge graph; obtain a second device knowledge graph of the user by inputting the obtained first device knowledge graph and the received server knowledge graph to a second AI model for extending the first device knowledge graph; and provide content based on the obtained second device knowledge graph.

14 Claims, 15 Drawing Sheets

(56) References Cited

U.S. PATENT DOCUMENTS

| | | | |
|---|---|---|---|
| 10,269,039 B2 | 4/2019 | Nam et al. | |
| 2005/0289005 A1 | 12/2005 | Ferber et al. | |
| 2008/0010272 A1* | 1/2008 | Schickel-Zuber | G06F 16/367 |
| | | | 707/999.005 |
| 2014/0025660 A1* | 1/2014 | Mohammed | G06Q 30/0241 |
| | | | 707/722 |
| 2015/0178776 A1 | 6/2015 | Li et al. | |
| 2015/0242447 A1 | 8/2015 | Ipeirotis et al. | |
| 2015/0293904 A1 | 10/2015 | Roberts | |
| 2015/0294358 A1 | 10/2015 | Galadari et al. | |
| 2016/0189028 A1 | 6/2016 | Hu et al. | |
| 2016/0189038 A1 | 6/2016 | Sansjay et al. | |
| 2016/0275562 A1 | 9/2016 | Elcock et al. | |
| 2017/0004279 A1* | 1/2017 | Pingali | G16Z 99/00 |
| 2017/0270567 A1 | 9/2017 | Sohn | |
| 2017/0309196 A1 | 10/2017 | Vangala et al. | |
| 2017/0330246 A1 | 11/2017 | Choe et al. | |
| 2018/0075359 A1* | 3/2018 | Brennan | G06N 5/022 |
| 2018/0150522 A1* | 5/2018 | Moskwinski | G06F 16/90335 |
| 2018/0239637 A1 | 8/2018 | Gupta et al. | |
| 2019/0057774 A1* | 2/2019 | Velez | G06N 20/00 |
| 2019/0392547 A1* | 12/2019 | Katouzian | G06V 20/62 |

FOREIGN PATENT DOCUMENTS

| | | |
|---|---|---|
| KR | 10-1517674 B1 | 5/2015 |
| KR | 10-1594560 B1 | 2/2016 |
| KR | 10-1762408 B1 | 7/2017 |
| KR | 10-2017-0110330 A | 10/2017 |
| KR | 10-1832419 B1 | 2/2018 |
| KR | 10-1837019 B1 | 3/2018 |

OTHER PUBLICATIONS

International Search Report (PCT/ISA/210) and Written Opinion (PCT/ISA/237) dated Jan. 28, 2020 issued by the International Searching Authority in International Application No. PCT/KR2019/013446.

Communication dated Jul. 10, 2023, issued by the European Patent Office in counterpart European Application No. 19873945.0.

Communication issued May 9, 2024 by the China National Intellectual Property Administration in Chinese Patent Application No. 201980066278.X.

Communication issued Dec. 20, 2024 by the Korean Intellectual Property Office in Korean Patent Application No. 10-2018-0123272.

* cited by examiner

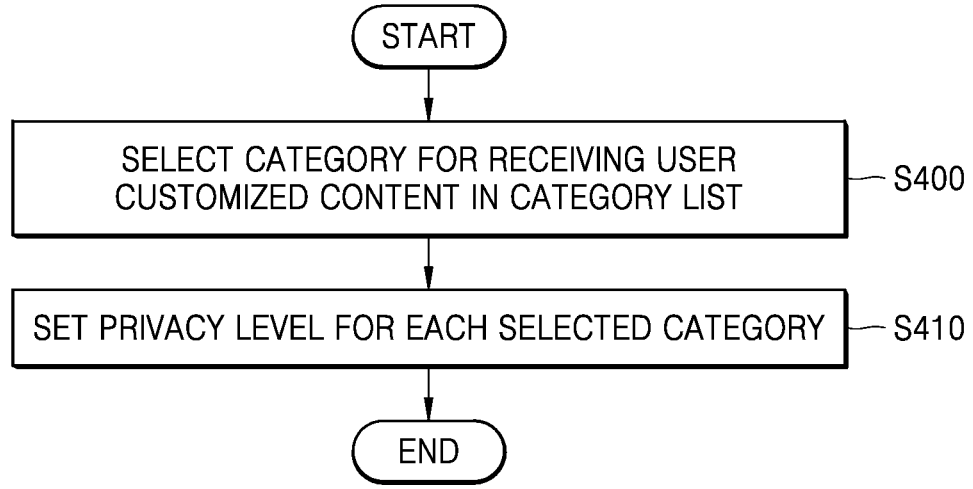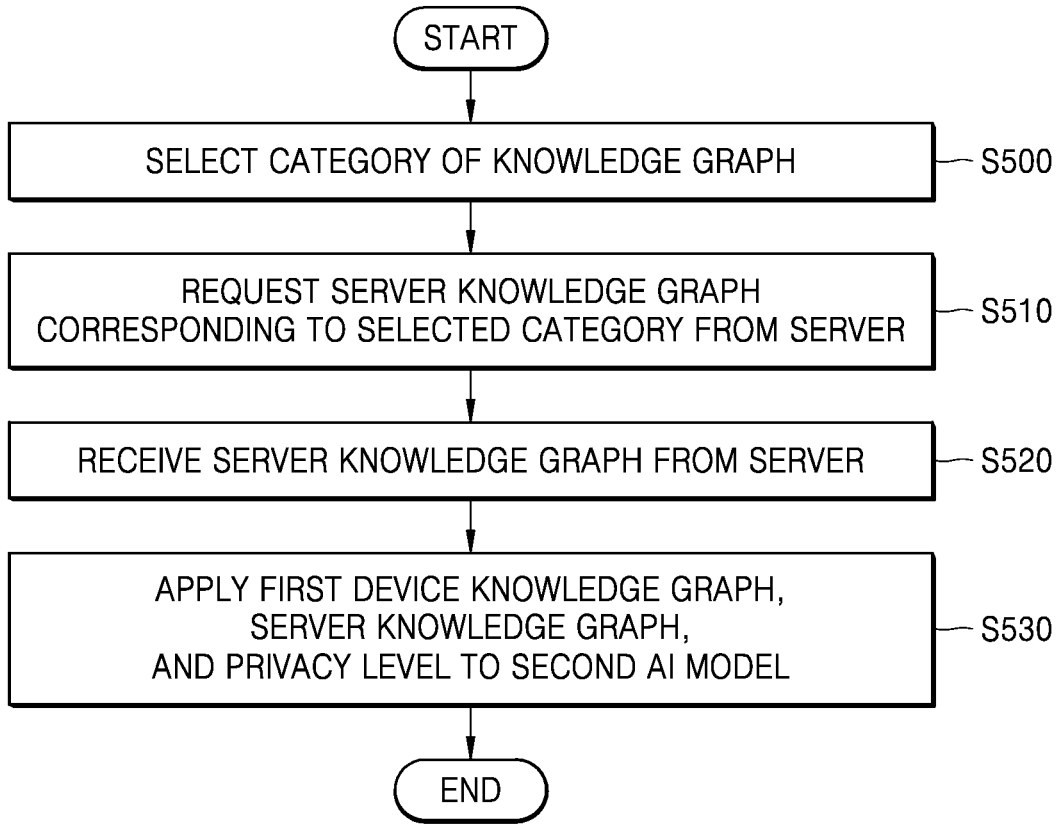

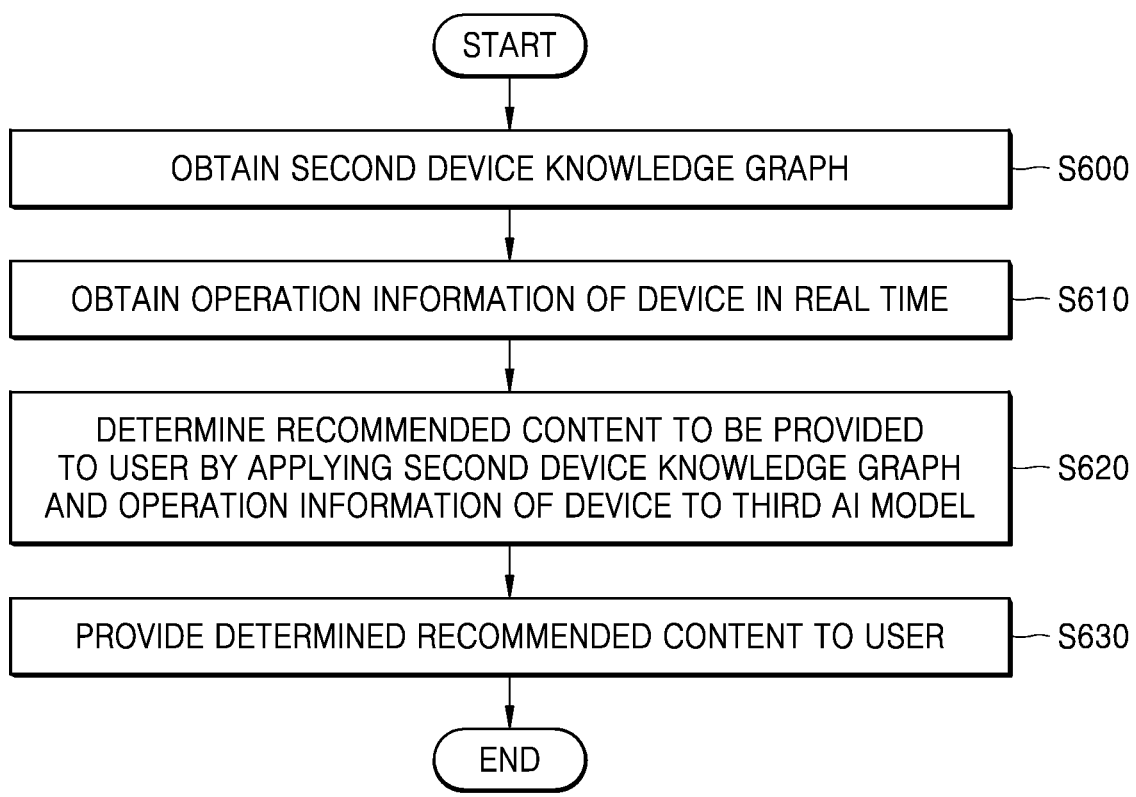

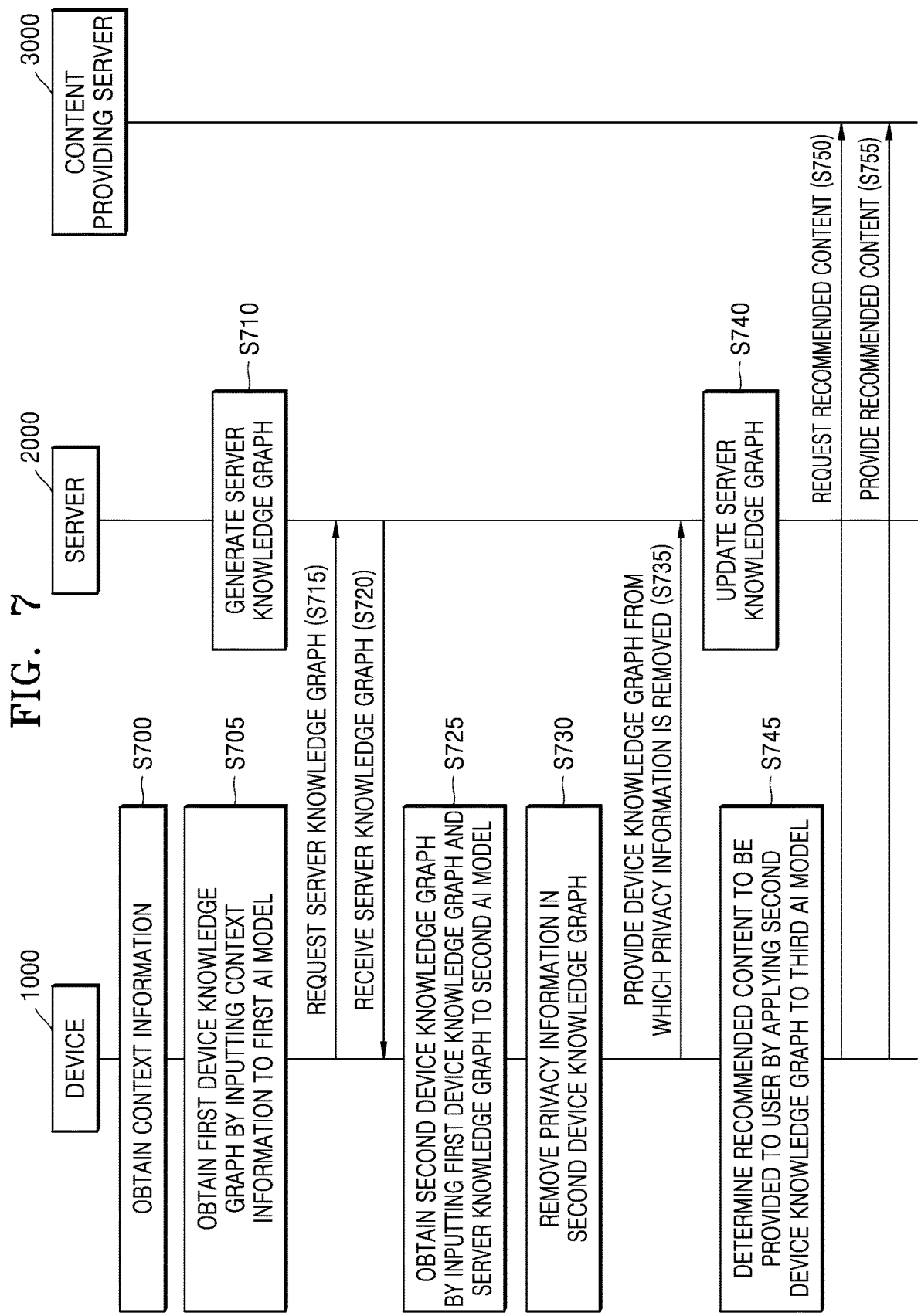

FIG. 8
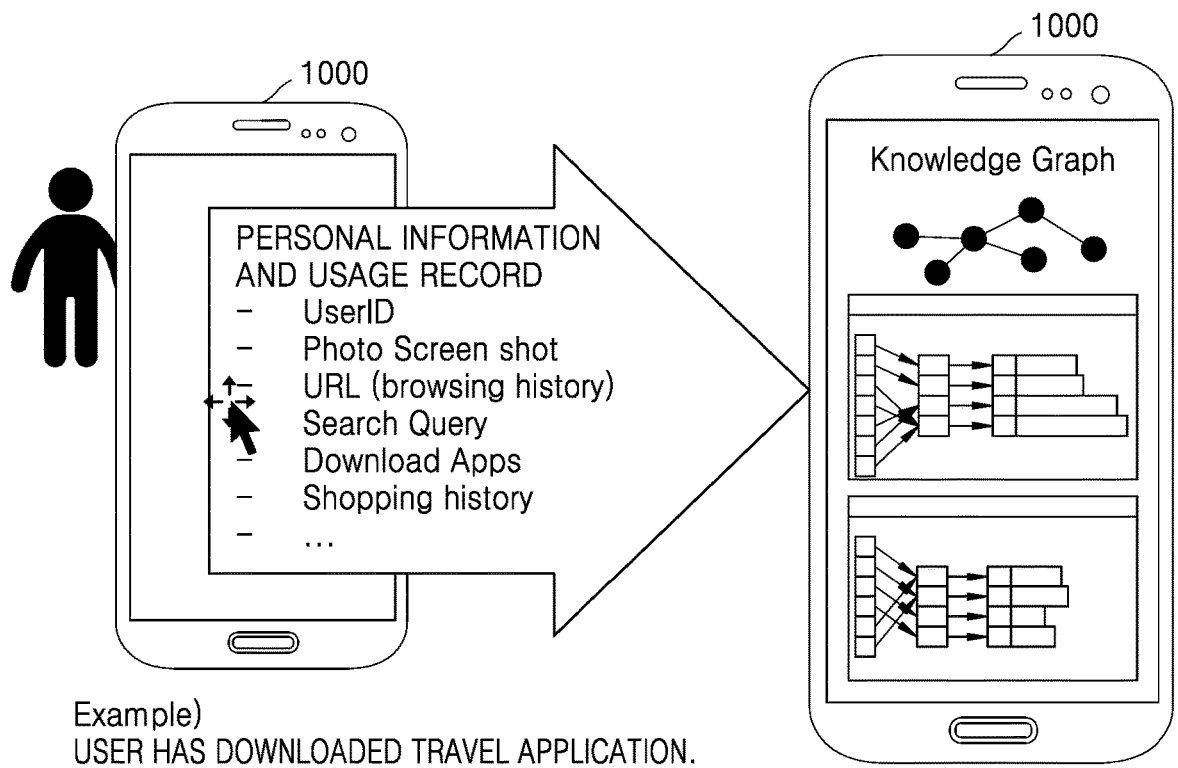
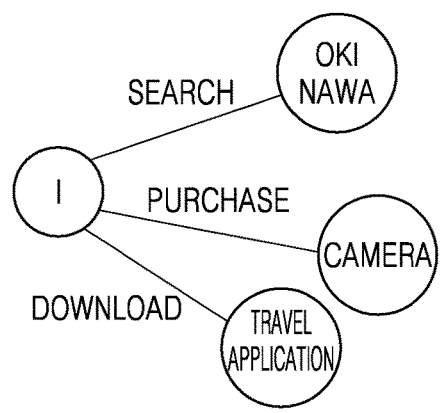

SYSTEM AND METHOD FOR PROVIDING CONTENT BASED ON KNOWLEDGE GRAPH

CROSS-REFERENCE TO RELATED APPLICATION(S)

This application is based on and claims priority under 35 U.S.C. § 119 to Korean Patent Application No. 10-2018-0123272, filed on Oct. 16, 2018, in the Korean Intellectual Property Office, the disclosure of which is incorporated by reference herein in its entirety.

BACKGROUND

1. Field

The disclosure relates to systems and methods for providing content based on a knowledge graph, and more particularly, systems and methods for providing content based on a knowledge graph considering a user's privacy.

2. Description of Related Art

An artificial intelligence (AI) system is a computer system configured to get smarter by training itself and making determinations spontaneously, unlike an existing rule-based smart system. Because a recognition rate of the AI system improves and the AI system more accurately understands a user's taste as the AI system is increasingly used, the rule-based smart system is being gradually replaced by a deep learning-based AI system.

AI technology includes machine learning (e.g., deep learning) and element technologies using the machine learning. Machine learning is an algorithm technology that self-classifies/learns characteristics of input data, and element technologies are technologies using a machine learning algorithm such as deep learning and include technical fields such as linguistic understanding, visual understanding, inference/prediction, knowledge representation, and motion control.

Various fields to which AI technology is applied are as follows. Linguistic understanding is a technology for recognizing and applying/processing human languages/characters and includes natural language processing, machine translation, dialog systems, question answering, and voice recognition/synthesis. Visual understanding is a technology for recognizing and processing objects like a human visual system and includes object recognition, object tracking, image searching, person recognition, scene understanding, spatial understanding, and image enhancement. Inference/prediction is a technology for judging information and logically inferring and predicting the same and includes knowledge/probability-based reasoning, optimization prediction, preference-based planning, and recommendation. Knowledge representation is an automation technology for incorporating human experience information into knowledge data and includes knowledge building (e.g., data generation/classification), and knowledge management (e.g., data utilization). Motion control is a technology for controlling self-driving of autonomous vehicles and the motion of robots and includes movement control (e.g., navigation, collision avoidance, or driving), and manipulation control (e.g., behavior control).

Furthermore, there is a demand for AI technology for protecting a user's privacy and effectively extending a knowledge graph related to the user.

SUMMARY

Provided are a system and method for obtaining and using a knowledge graph related to a user by using a plurality of artificial intelligence (AI) models.

Also provided are a system and method for protecting individual privacy and obtaining and using a knowledge graph related to a user.

Furthermore, provided are a system and method for effectively extending a knowledge graph related to a user and providing recommended content to the user through cooperation between a device and a server.

Additional aspects will be set forth in part in the description which follows and, in part, will be apparent from the description, or may be learned by practice of the presented embodiments.

In accordance with an aspect of the disclosure, a device for providing content based on a knowledge graph includes: a device for providing content based on a knowledge graph, the device including: a communication interface; a memory storing one or more instructions; and a processor configured to execute the one or more instructions to: obtain context information related to the device; obtain a first device knowledge graph of a user of the device by inputting the obtained context information to a first artificial intelligence (AI) model for determining a relation between entities related to the user of the device; control to request, from a server, a server knowledge graph generated by the server; control to receive the server knowledge graph from the server; obtain a second device knowledge graph of the user by inputting the obtained first device knowledge graph and the received server knowledge graph to a second AI model for extending the first device knowledge graph; and provide content based on the obtained second device knowledge graph.

Each of the first AI model and the second AI model may be an AI model trained by using, as an AI algorithm, at least one of a machine learning algorithm, a neural network algorithm, a genetic algorithm, a deep learning algorithm, or a classification algorithm.

The server knowledge graph may be generated by the server based on big data provided to the server by the device and at least one other device.

The processor may be further configured to execute the one or more instructions to process the context information into text indicating sequential operations and input the text into the first AI model.

The processor may be further configured to execute the one or more instructions to determine a privacy level for the first device knowledge graph and input the determined privacy level to the first AI model; and a part of data in the first device knowledge graph output from the first AI model may include data abstracted according to the privacy level.

The processor may be further configured to execute the one or more instructions to input a category to the first AI model; and the first device knowledge graph corresponding to the input category may be output from the first AI model.

The first AI model may output the first device knowledge graph through at least one of entity extraction, entity analysis and abstraction, and relation extraction.

The processor may be further configured to execute the one or more instructions to: control to transmit, to the server, information about a user profile of the user; and control to receive, from the server, the server knowledge graph related to the user profile.

The processor may be further configured to execute the one or more instructions to control to transmit a certain category to the server and to receive, from the server, the server knowledge graph corresponding to the certain category.

The processor may be further configured to execute the one or more instructions to: determine content to be recommended to the user by inputting, to a third AI model, operation information of the device and the second device knowledge graph; and control request a content providing server for the determined content to be recommended.

In accordance with another aspect of the disclosure, a method, performed by a device, of providing content based on a knowledge graph, includes: obtaining context information related to the device; obtaining a first device knowledge graph of a user of the device by inputting the obtained context information to a first artificial intelligence (AI) model for determining a relation between entities related to the user of the device; requesting, from a server, a server knowledge graph generated by the server; receiving, from the server, the server knowledge graph; obtaining a second device knowledge graph of the user by inputting the obtained first device knowledge graph and the received server knowledge graph to a second AI model for extending the first device knowledge graph; and providing content based on the obtained second device knowledge graph.

Each of the first AI model and the second AI model may be an AI model trained by using, as an AI algorithm, at least one of a machine learning algorithm, a neural network algorithm, a genetic algorithm, a deep learning algorithm, or a classification algorithm.

The server knowledge graph may be generated by the server based on big data provided to the server by the device and at least one other device.

The method may further include processing the context information into text indicating sequential operations, wherein the obtaining the first device knowledge graph may include inputting the text to the first AI model.

The method may further include determining a privacy level for the first device knowledge graph, wherein the obtaining the first device knowledge graph may include inputting the privacy level to the first AI model, and wherein part of data in the first device knowledge graph output from the first AI model may include data abstracted according to the privacy level.

The obtaining the first device knowledge graph may include inputting a category to the first AI model; and the first device knowledge graph corresponding to the input category may be output from the first AI model.

The first AI model may output the first device knowledge graph through at least one of entity extraction, entity analysis and abstraction, and relation extraction.

The requesting the server knowledge graph from the server may include transmitting, to the server, information about a user profile of the user; and the receiving the server knowledge graph may include receiving, from the server, the server knowledge graph related to the user profile.

The requesting the server knowledge graph from the server may include transmitting a certain category to the server; and the receiving the server knowledge graph may include receiving, from the server, the server knowledge graph corresponding to the certain category.

In accordance with another aspect of the disclosure, a non-transitory computer-readable recording medium has recorded thereon a program executable by at least one processor to perform: obtaining context information related to a device; obtaining a first device knowledge graph of a user of the device by inputting the obtained context information to a first artificial intelligence (AI) model for determining a relation between entities related to the user of the device; controlling to request, from a server, a server knowledge graph generated by the server; controlling to receive, from the server, the server knowledge graph; obtaining a second device knowledge graph of the user by inputting the obtained first device knowledge graph and the received server knowledge graph to a second AI model for extending the first device knowledge graph; and providing content based on the obtained second device knowledge graph.

Each of the first AI model and the second AI model may be an AI model trained by using, as an AI algorithm, at least one of a machine learning algorithm, a neural network algorithm, a genetic algorithm, a deep learning algorithm, or a classification algorithm.

The server knowledge graph may be generated by the server based on big data provided to the server by the device and at least one other device.

The program may be executable by the at least one processor to further perform processing the context information into text indicating sequential operations; and the obtaining the first device knowledge graph may include inputting the text to the first AI model.

The program may be executable by the at least one processor to further perform determining a privacy level for the first device knowledge graph; the obtaining the first device knowledge graph may include inputting the privacy level to the first AI model; and part of data in the first device knowledge graph output from the first AI model may include data abstracted according to the privacy level.

The obtaining the first device knowledge graph may include inputting a category to the first AI model; and the first device knowledge graph corresponding to the input category may be output from the first AI model.

In accordance with another aspect of the disclosure, a device for providing content based on a knowledge graph includes: a memory storing one or more instructions; and a processor configured to execute the one or more instructions to: obtain a first device knowledge graph of a user of the device by inputting, to a first artificial intelligence (AI) model for determining a relation between entities related to the user of the device, context information related to the device; control to receive, from a server, a server knowledge graph; obtain a second device knowledge graph of the user by inputting the obtained first device knowledge graph and the received server knowledge graph to a second AI model for extending the first device knowledge graph; and obtain content based on the obtained second device knowledge graph.

Each of the first AI model and the second AI model may be an AI model trained by using, as an AI algorithm, at least one of a machine learning algorithm, a neural network algorithm, a genetic algorithm, a deep learning algorithm, or a classification algorithm.

The server knowledge graph may be generated by the server based on big data provided to the server by the device and at least one other device.

The processor may be further configured to execute the one or more instructions to process the context information into text indicating sequential operations and input the text into the first AI model.

The processor may be further configured to execute the one or more instructions to determine a privacy level for the first device knowledge graph and input the determined privacy level to the first AI model; and a part of data in the first device knowledge graph output from the first AI model may include data abstracted according to the privacy level.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a flowchart of a method, performed by a device, of setting a category and a privacy level to receive customized content, according to an embodiment;

FIG. 5 is a flowchart of a method, performed by a device, of extending a first device knowledge graph by using a server knowledge graph corresponding to a specific category, according to an embodiment;

FIG. 6 is a flowchart of a method, performed by a device, of determining content to be provided to a user by using operation information of the device and a second device knowledge graph, according to an embodiment;

FIG. 7 is a diagram of a method, performed by a system, of providing customized content to a user, according to an embodiment;

FIG. 8 is a diagram illustrating an example in which a device generates a first device knowledge graph by using text indicating context related to the device, according to an embodiment;

DETAILED DESCRIPTION

Figure 1:
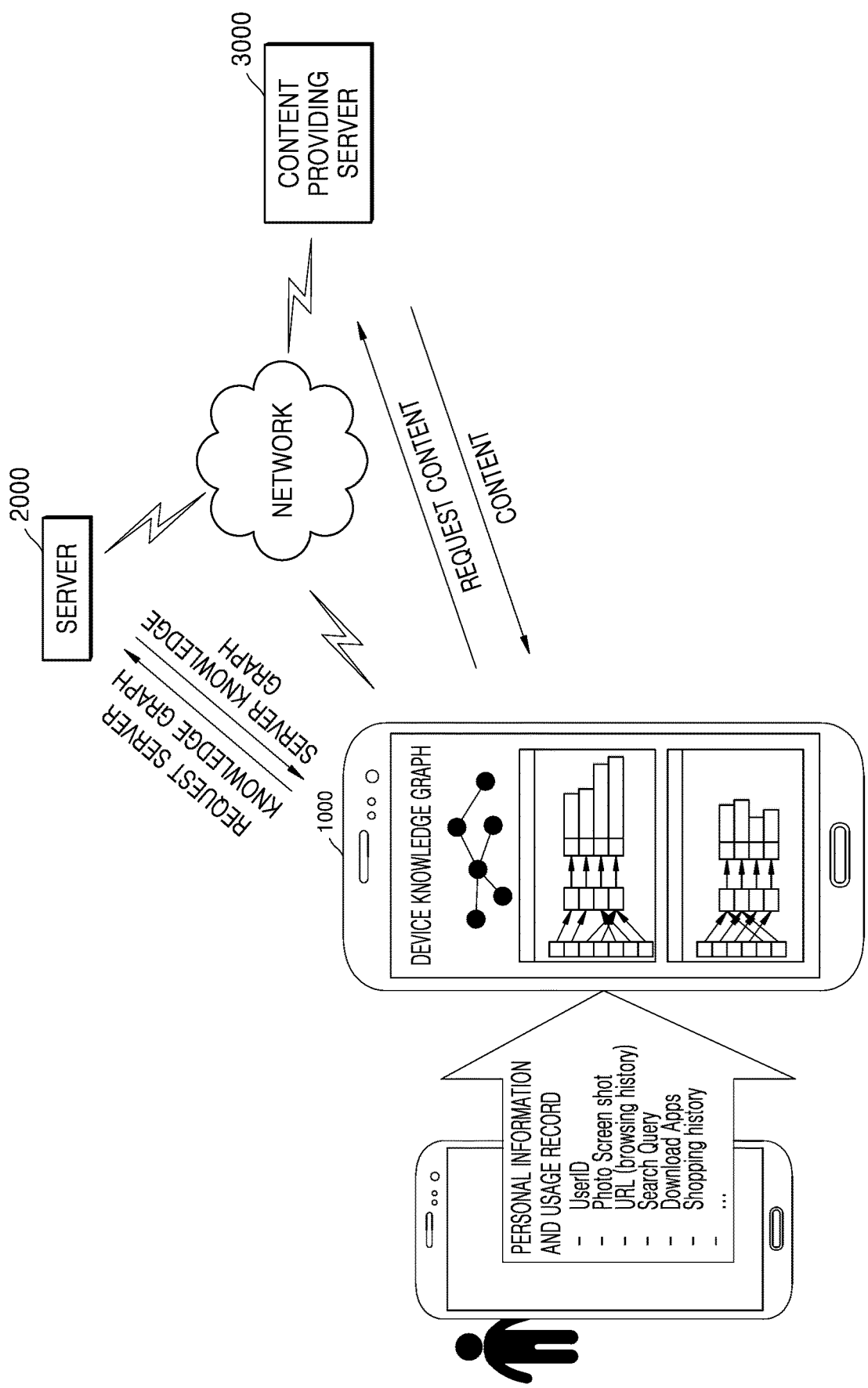
FIG. 1 is a diagram of a system for providing content based on a knowledge graph about a user, according to an embodiment.

Hereinafter, embodiments of the disclosure will be described in detail in order to fully convey the scope of the disclosure and enable one of ordinary skill in the art to easily embody and practice the disclosure. Embodiments of the disclosure may be implemented in various forms and the disclosure is not limited to specific embodiments described in detail below. Also, like reference numerals in the drawings denote like elements.

Throughout the disclosure, expressions such as "at least one of a, b or c" and "at least one of a, b and c" indicates only a, only b, only c, both a and b, both a and c, both b and c, all of a, b, and c, or variations thereof.

Throughout the specification, it will be understood that when an element is referred to as being "connected" to another element, the element may be "directly connected" to the other element or "electrically connected" to the other element with intervening elements therebetween. It will be further understood that when a part "includes" or "comprises" an element, unless otherwise defined, the part may further include other elements, not excluding the other elements.

In the specification, a device knowledge graph may be a knowledge graph generated in a user's device. The device knowledge graph may be generated by reflecting the user's privacy information collected in the user's device.

Additionally, a server knowledge graph may be a knowledge graph generated in a server. The server knowledge graph may be generated by the server based on big data collected from various devices.

Also, an artificial intelligence (AI) model may be an AI model trained by using at least one of a machine learning algorithm, a neural network algorithm, a genetic algorithm, a deep learning algorithm, or a classification algorithm as an AI algorithm.

Furthermore, content may be digital information provided through a wired/wireless communication network. Examples of the content may include, but are not limited to, advertising content, moving image content (e.g., TV programs, videos on-command (VODs), user-created content (UCC), music videos, or YOUTUBE videos), still image content (e.g., photographs or pictures), text content (e.g., electronic books including poetry and novels, letters, or work files), music content (e.g., music, performances, or radio broadcasts), web pages, and application execution information.

Embodiments will now be described more fully with reference to the accompanying drawings.

FIG. 1 is a diagram of a system for providing content based on a knowledge graph about a user according to an embodiment.

Referring to FIG. 1, a system for providing content based on a knowledge graph about a user may include a device 1000, a server 2000, and a content providing server 3000.

The device 1000 may collect context information about the device 1000 and may generate a device knowledge graph by using the collected context information and at least one AI model. Also, the device 1000 may receive a server knowledge graph generated by the server 2000 from the server 2000 and may extend or expand the device knowledge graph by using the received server knowledge graph and at least one AI model. The device knowledge graph generated and extended by the device 1000 may include information related to the user's privacy, and the device knowledge graph including privacy information may be used and managed in the device 1000. Also, the device 1000 may determine content to be recommended to the user by using the extended device knowledge graph and may receive the determined recommended content from the content providing server 3000.

The server 2000 may generate the server knowledge graph based on big data received from various devices 1000. The big data used to generate the server knowledge graph may be data excluding the information related to the user's privacy. For example, the big data may include information abstracted from the privacy information of the user.

The content providing server 3000 may be a server that manages and provides content to the device 1000. The content providing server 3000 may be a server that provides, for example, a movie, a game, an advertisement, etc.

Examples of the device 1000 may include, but are not limited to, a smartphone, a tablet personal computer (PC), a PC, a smart television (TV), a mobile phone, a personal digital assistant (PDA), a laptop, a media player, a microserver, a global positioning system (GPS) device, an electronic book terminal, a digital broadcast terminal, a navigation system, a kiosk, an MP3 player, a digital camera, a home appliance, a portable media device, and any of other mobile or non-mobile computing devices. Also, examples of the device 1000 may include a wearable device such as a watch, glasses, a hair band, or a ring having a communication function and a data processing function. It is understood, however, that the disclosure is not limited thereto, and the device 1000 may include any type of device that may transmit/receive data through a network to/from the server 2000 and the content providing server 3000.

Examples of the network may include a local area network (LAN), a wide area network (WAN), a value-added network (VAN), a mobile radio communication network, a satellite communication network, and a combination thereof. Further, the network is a data communication network for smooth communication between network components in a broad sense, and examples of the network may include a wired Internet, a wireless Internet, and a mobile wireless communication network.

Examples of wireless communication may include, but are not limited to, Wi-Fi, Bluetooth, Bluetooth low energy, Zigbee, Wi-Fi Direct (WFD), ultra-wideband (UWB), infrared data association (IrDA), and near-field communication (NFC).

Figure 2:
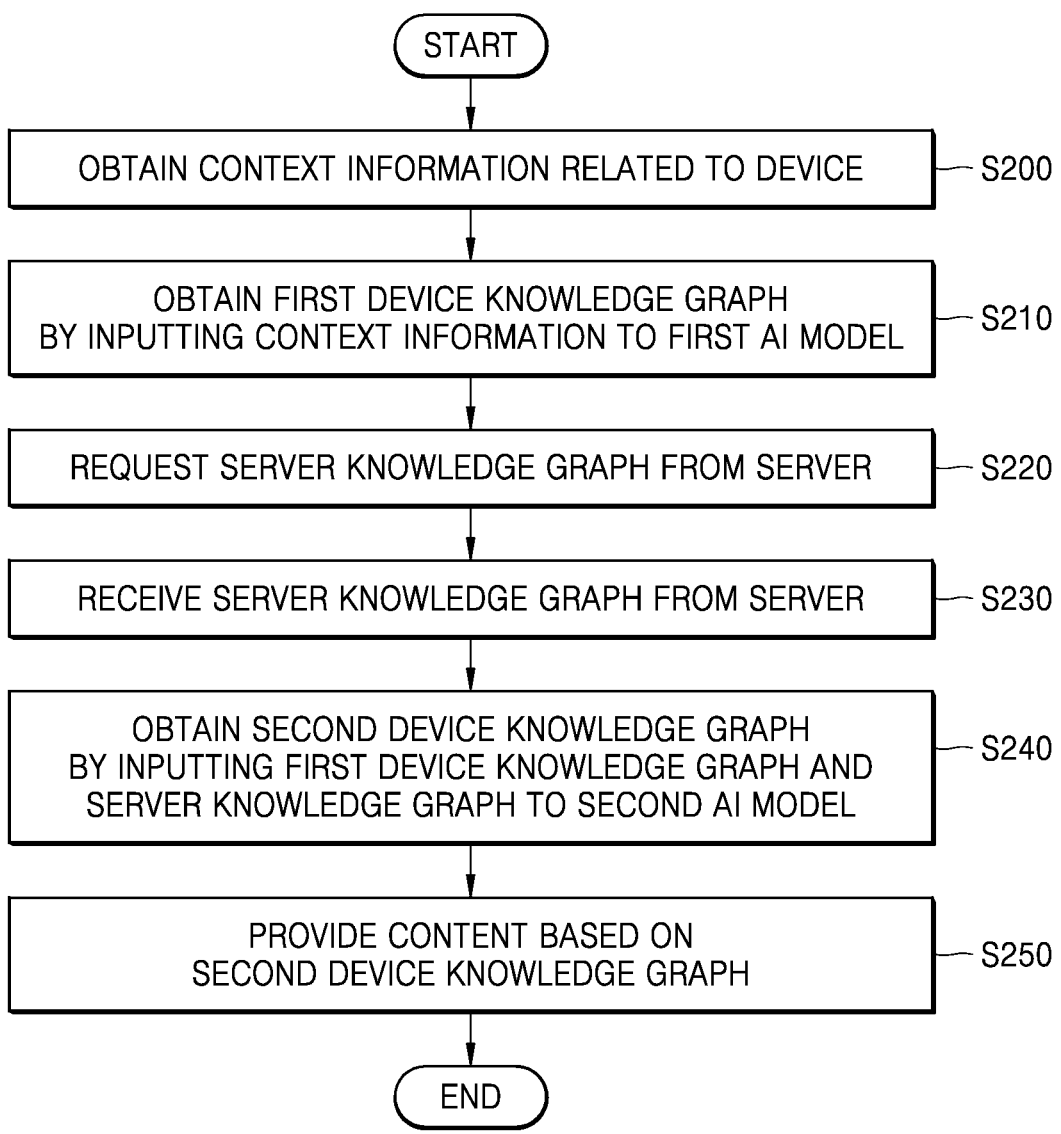
FIG. 2 is a flowchart of a method, performed by a device, of providing content by using a knowledge graph based on an artificial intelligence (AI) model, according to an embodiment.

FIG. 2 is a flowchart of a method, performed by a device 1000, of providing content by using a knowledge graph based on an AI model according to an embodiment.

Referring to FIG. 2, in operation S200, the device 1000 may obtain context information related to the device 1000. The device 1000 may monitor an operation of an application in the device 1000 and may collect information related to the device 1000 from a sensor in the device 1000 and another device connected to the device 1000.

The context information may include at least one of, but not limited to, ambient environment information of the device 1000, state information of the device 1000, state information of a user who uses the device 1000, a device usage history information of the user, or schedule information of the user. The ambient environment information of the device 1000 refers to environment information within a certain radius from the device 1000 and may include, but is not limited to, at least one of weather information, temperature information, humidity information, illuminance information, noise information, and sound information. The state information of the device 1000 may include, but is not limited to, at least one of information about a mode of the device 1000 (e.g., a sound mode, a vibration mode, a silent mode, a power saving mode, a cutoff mode, a multi-window mode, or an automatic rotation mode), position information of the device 1000, time information, activation information of a communication module (e.g., Wi-Fi ON, Bluetooth OFF, GPS ON, or NFC ON), network connection state information of the device 1000, and information about an application executed by the device 1000 (e.g., application identification information, an application type, an application usage time, or an application usage cycle). The state information of the user refers to information about the user's movement or life pattern and may include, but is not limited to, at least one of information about the user's walking state, exercising state, driving state, sleep state, and mood state. The device usage history information of the user refers to information about events where the user uses the device 1000 and may include, but is not limited to, information about at least one of execution of applications, functions executed by the applications, the user's phone conversations, and the user's text messages.

In operation S210, the device 1000 may obtain a first device knowledge graph by inputting the context information to a first AI model. For example, the device 1000 may process the context information and may obtain a first device knowledge graph by inputting the processed context information to the first AI model.

The first device knowledge graph may be a knowledge graph generated based on context related to the user and/or the device 1000 and may be generated by reflecting information related to the user's privacy. The first AI model may be an AI model that may generate and update a knowledge graph based on the context of the user and/or the device 1000. The AI model may be trained by using at least one of a machine learning algorithm, a neural network algorithm, a genetic algorithm, a deep learning algorithm, or a classification algorithm as an AI algorithm. The first AI model may function to extract entities in the context information and infer a relation between the extracted entities.

The device 1000 may generate the first device knowledge graph for each of certain categories. The device 1000 may generate the first device knowledge graph according to a privacy level for protecting the user's personal information. The privacy level may indicate a degree to which the user's personal information is protected, and a degree to which data related to the user's privacy in data in the first device knowledge graph is abstracted may be determined according to the privacy level.

In operation S220, the device 1000 may request a server knowledge graph from the server 2000. For example, the device 1000 may transmit at least one of information related to the user's profile and an identification value of a category selected by the user to the server 2000, and may request the server knowledge graph from the server 2000.

The server knowledge graph, which is a knowledge graph generated by the server 2000, may be a knowledge graph generated based on big data received from various users and various devices. The big data used to generate the server knowledge graph may include context information related to various circumstances, and may be data excluding information related to individual privacy. Also, the server knowledge graph may be generated by a certain AI model using the big data as an input value, and, for example, may be generated for each category and profile characteristics of the user.

In operation S230, the device 1000 may receive the server knowledge graph from the server 2000. The device 1000 may receive the server knowledge graph related to the user's profile. Furthermore, the device 1000 may receive the server knowledge graph related to the category selected by the user.

In operation S240, the device 1000 may obtain a second device knowledge graph by inputting the first device knowledge graph and the server knowledge graph to a second AI model. The second device knowledge graph may be a knowledge graph extended from the first device knowledge graph. The second AI model may be an AI model for extending and updating the first device knowledge graph. The second AI model may be trained by using at least one of a machine learning algorithm, a neural network algorithm, a genetic algorithm, a deep learning algorithm, or a classification algorithm as an AI algorithm. The second AI model may function to extend the first device knowledge graph by analyzing and integrating the first device knowledge graph and the server knowledge graph.

In operation S250, the device 1000 may provide content based on the second device knowledge graph. The device 1000 may identify a current context of the device 1000 and may determine content suitable for the current context as recommended content by using the second device knowledge graph. Also, the device 1000 may request the determined recommended content from the content providing server 3000 and may receive the requested recommended content from the content providing server 3000.

Content may be digital information provided through a wired/wireless communication network. Examples of the content may include, but are not limited to, advertising content, moving image content (e.g., TV programs, VODs, UCC, music videos, or YOUTUBE videos), still image content (e.g., photographs or pictures), text content (e.g., electronic books including poetry and novels, letters, or work files), music content (e.g., music, performances, or radio broadcasts), web pages, gaming content, application execution information, etc.

Figure 3:
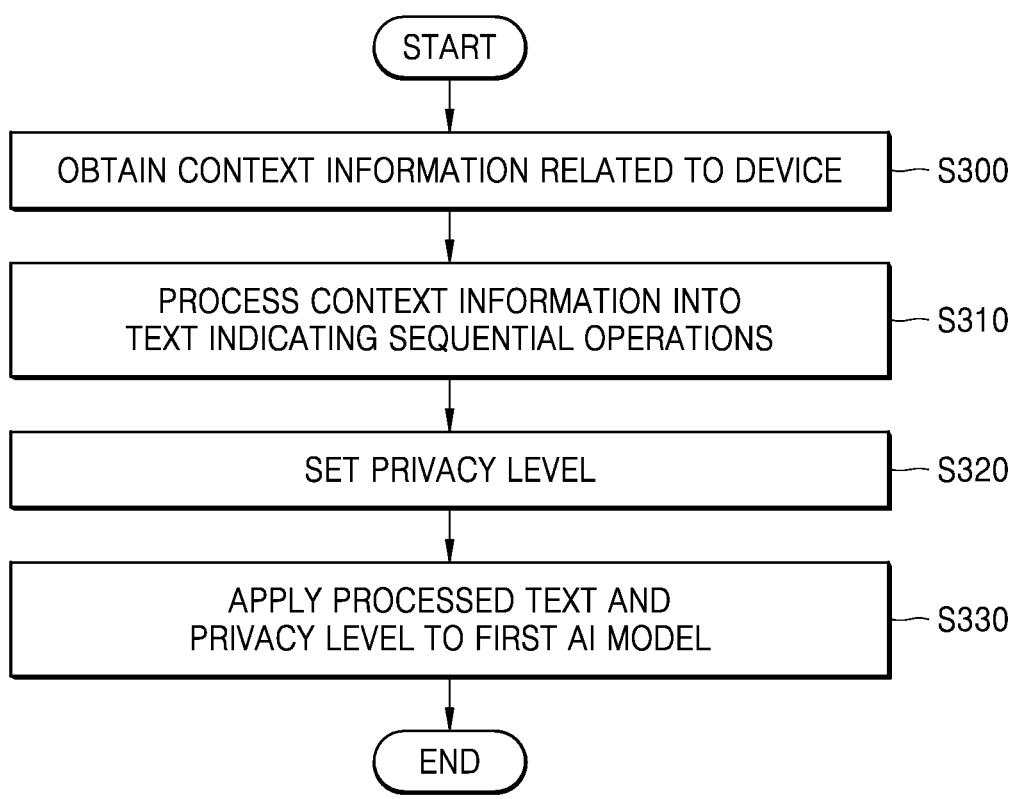
FIG. 3 is a flowchart of a method, performed by a device, of generating a first device knowledge graph, according to an embodiment.

FIG. 3 is a flowchart of a method, performed by a device 1000, of generating a first device knowledge graph according to an embodiment.

Referring to FIG. 3, in operation S300, the device 1000 may obtain context information related to the device 1000. The context information may include at least one of, but not limited to, ambient environment information of the device 1000, state information of the device 1000, state information of a user who uses the device 1000, a device usage history information of the user, or schedule information of the user. By monitoring an operation of an application installed in the device 1000, the device 1000 may collect, for example, at least one of an operation executed by the application, data input to the application, and data output through the application. Also, by obtaining sensing data sensed by sensors in the device 1000, the device 1000 may obtain information about an ambient environment of the device 1000 and information about a state of the device 1000.

In operation S310, the device 1000 may process the context information into text indicating sequential operations. The device 1000 may generate, based on the context information, sentences indicating context related to the device 1000 and/or the user. For example, the device 1000 may generate text such as "user has downloaded a travel application," "user has searched Okinawa," and "user purchased a camera at 9 a.m. on Saturday."

In operation S320, the device 1000 may set a privacy level of a device knowledge graph. In order to abstract data related to the user's privacy in data in the device knowledge graph, the device 1000 may set the privacy level of the device knowledge graph. For example, the device 1000 may display a graphical user interface (GUI) for setting the privacy level of the device knowledge graph and may set the privacy level of the device knowledge graph based on a user input through the GUI.

In operation S330, the device 1000 may apply the text in operation S310 and the privacy level set in operation S320 to a first AI model. The device 1000 may abstract data related to individual privacy by inputting the text and the privacy level to the first AI model, and first user knowledge data based on the abstracted data may be output from the first AI model. Also, according to the privacy level, a degree to which the data related to the user's privacy in data in a first device knowledge graph is abstracted may be determined according to the privacy level.

For example, when text "user has purchased a Big Mac burger from McDonald's" and a certain privacy level value "1" are input to the first AI model, the first device knowledge graph based on abstracted data "user has purchased a hamburger from McDonald's" may be output. Also, for example, when text "user has purchased a Big Mac burger from McDonald's" and a certain privacy level value '2' are input to the first AI model, the first device knowledge graph based on abstracted data "user has purchased a hamburger from a hamburger store" may be output.

FIG. 4 is a flowchart of a method, performed by a device 1000, of setting a category and a privacy level to receive customized content according to an embodiment.

Referring to FIG. 4, in operation S400, the device 1000 may select at least one category for receiving user customized content in a category list. The device 1000 may display a certain category list on a screen of the device 1000 and may receive a user input that selects a specific category in the certain category list. Categories may be divided according to at least one of a type of content, a field of the content, or a size of the content. For example, categories may be divided into, but not limited to, a movie, a sport, a game, and an advertisement.

In operation S410, the device 1000 may set a privacy level for each selected category. The device 1000 may display a GUI for inputting the privacy level on the screen of the device 1000 and may set the privacy level for each category based on a user input through the GUI. Accordingly, the privacy level may be differently set for each category, and the device 1000 may generate a device knowledge graph for each category according to the differently set privacy level.

FIG. 5 is a flowchart of a method, performed by a device 1000, of extending a first device knowledge graph by using a server knowledge graph corresponding to a specific category according to an embodiment.

Referring to FIG. 5, in operation S500, the device 1000 may select a category of a knowledge graph, and in operation S510, the device 1000 may request a server knowledge graph corresponding to the selected category from the server 2000. The server 2000 may generate and store the server knowledge graph for each of certain categories by using big data received from various devices. In this case, by inputting the big data and a category value to a certain AI model, the server 2000 may generate the server knowledge graph for each category.

In operation S520, the device 1000 may receive the server knowledge graph from the server 2000. For example, the device 1000 may receive the server knowledge graph corresponding to the selected category from the server 2000.

In operation S530, the device 1000 may apply a first device knowledge graph, the server knowledge graph, and a privacy level value to a second AI model. The device 1000 may extract the first device knowledge graph corresponding to the certain category from a memory of the device 1000 and may input the extracted first device knowledge graph and the server knowledge graph corresponding to the certain category to the second AI model. Also, the device 1000 may input the privacy level value set for the first device knowledge graph corresponding to the certain category to the second AI model. Accordingly, the device 1000 may obtain a second device knowledge graph extended from the first device knowledge graph from the second AI model.

FIG. 6 is a flowchart of a method, performed by a device 1000, of determining content to be provided to a user by using operation information of the device 1000 and a second device knowledge graph according to an embodiment.

Referring to FIG. 6, in operation S600, the device 1000 may obtain a second device knowledge graph. The device 1000 may obtain the second device knowledge graph extended from a first device knowledge graph by using a server knowledge graph.

In operation S610, the device 1000 may obtain operation information of the device 1000 in real time. The device 1000 may obtain context related to the device 1000, such as at least one of an application that is being executed in the device 1000, a function of the application that is being executed, an ambient environment of the device 1000, and schedule information stored in the device 1000, as the operation information of the device 1000 in real time.

In operation S620, the device 1000 may determine recommended content to be provided to a user by applying the second device knowledge graph and the operation information of the device 1000 to a third AI model. The third AI model may be an AI model for determining the recommended content to be recommended to the user based on the operation information of the device 1000 and/or the user and the second device knowledge graph. The third AI model may be trained by using at least one of a machine learning algorithm, a neural network algorithm, a genetic algorithm, a deep learning algorithm, or a classification algorithm as an AI algorithm. The third AI model may function to recommend content of a field in which the user is interested, according to a context of the device 1000 and the second device knowledge graph based on real time operation information of the device 1000.

In operation S630, the device 1000 may provide the determined recommended content to the user. For example, the device 1000 may identify the content providing server 3000 that provides the determined recommended content and may request the recommended content from the content providing server 3000. Also, the device 1000 may receive the recommended content from the content providing server 3000. Accordingly, the device 1000 may provide the recommended content suitable for the user to the user, without providing information related to the user's privacy to the content providing server 3000. Also, examples of the recommended content may include, but are not limited to, advertising content, moving image content (e.g., TV programs, VODs, UCC, music videos, or YOUTUBE videos), still image content (e.g., photographs or pictures), text content (e.g., electronic books including poetry and novels, letters, or work files), music content (e.g., music, performances, or radio broadcasts), web pages, gaming content, and application execution information.

FIG. 7 is a diagram of a method, performed by a system, of providing customized content to a user according to an embodiment.

Referring to FIG. 7, in operation S700, the device 1000 may obtain context information. The device 1000 may collect the context information related to the device 1000 and/or a user and may process the collected context information into certain text.

In operation S705, the device 1000 may obtain a first device knowledge graph by inputting the context information to a first AI model. For example, the device 1000 may input the text processed from the context information to the first AI model. Also, the device 1000 may input a privacy level and a category value to the first AI model. The device 1000 may obtain the first device knowledge graph from the first AI model.

In operation S710, the server 2000 may generate a server knowledge graph. The server 2000 may collect various kinds of big data from various devices and may generate the server knowledge graph by using the collected big data. The big data collected by the server 2000 may be data abstracted from individual privacy information.

In operation S715, the device 1000 may request the server knowledge graph from the server 2000. For example, the device 1000 may transmit information about the user's profile and/or the category value to the server 2000 and may request the server knowledge graph from the server 2000. In this case, information about the user's privacy in the information about the user's profile may be abstracted information.

In operation S720, the device 1000 may receive the server knowledge graph from the server 2000. The server 2000 may extract the server knowledge graph to be provided to the device 1000 from a database (DB) in consideration of the user's profile and/or a category and may provide the extracted server knowledge graph to the device 1000. In this case, the server knowledge graph may be generated according to the user's profile and/or the category and may be stored in the DB of the server 2000.

In operation S725, the device 1000 may obtain a second device knowledge graph by inputting the first device knowledge graph and the server knowledge graph to a second AI model. The second AI model may output the second device knowledge graph by extending the first device knowledge graph using the server knowledge graph.

In operation S730, the device 1000 may remove privacy information in the second device knowledge graph. The device 1000 may abstract data related to the user's privacy in data in the second device knowledge graph.

In operation S735, the device 1000 may provide a device knowledge graph from which the privacy information is removed to the server 2000.

In operation S740, the server 2000 may update the server knowledge graph by using the device knowledge graph from which the privacy information is removed. By inputting the server knowledge graph generated in operation S710 and the device knowledge graph received in operation S735 to a certain AI model, the server 2000 may update the server knowledge graph. The updated server knowledge graph may later be used by the device 1000 to generate the second device knowledge graph.

In operation S745, the device 1000 may determine recommended content to be provided to the user by applying the second device knowledge graph to a third AI model. The device 1000 may receive information about the recommended content from the third AI model by inputting operation information of the device 1000 and the second device knowledge graph to the third AI model. The information about the recommended content may include at least one of, but not limited to, an identification value of the recommended content, a type of the recommended content, or a field of the recommended content.

In operation S750, the device 1000 may request the recommended content from the content providing server 3000, and in operation S755, the device 1000 may receive the recommended content from the content providing server 3000.

FIG. 8 is a diagram illustrating an example in which a device 1000 generates a first device knowledge graph by using text indicating context related to the device according to an embodiment.

Referring to FIG. 8, the device 1000 may obtain context information about a device usage record and personal information stored in or input to the device 1000. Also, the device 1000 may generate text such as "user has downloaded a travel application," "user has searched Okinawa," and "user has purchased a camera."

The device 1000 may input the generated text to a first AI model, and the first AI model may input a first device knowledge graph defining entities and a relation between the entities. For example, the entities of the first device knowledge graph may include "I," "Okinawa," "camera," and "travel application." In this case, a relation between the entity "I" and the entity "Okinawa" may be "search." Furthermore, in this example, a relation between the entity "I" and the entity "camera" may be "purchase." Also, a relation between the entity "I" and the entity "travel application" may be "download."

Figure 9:
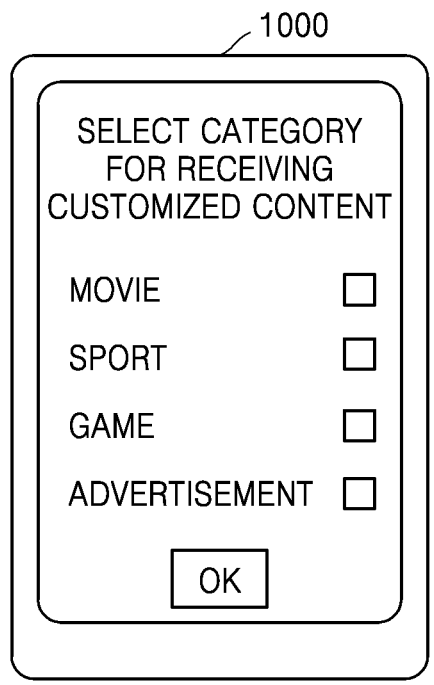
FIG. 9 is a diagram illustrating an example in which a device selects a category to receive customized content, according to an embodiment.

FIG. 9 is a diagram illustrating an example in which a device 1000 selects a category to receive customized content according to an embodiment.

Referring to FIG. 9, in order for a user to receive user customized content for only a specific category, the device 1000 may display a category list for selecting the specific category on a screen of the device 1000. For example, the device 1000 may display a guide paragraph for allowing the user to select a category and may display identification values of categories such as "movie," "sport," "game," and "advertisement," thereby making it possible for the user to select a specific category.

Figure 10:
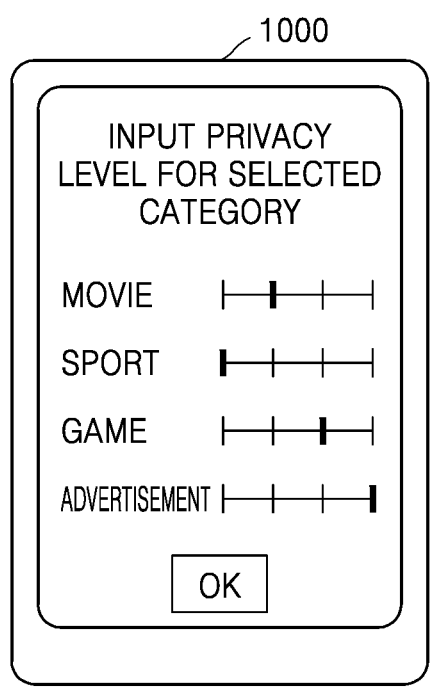
FIG. 10 is a diagram illustrating an example in which a device selects a privacy level for a category, according to an embodiment.

FIG. 10 is a diagram illustrating an example in which a device 1000 selects a privacy level for a category according to an embodiment.

Referring to FIG. 10, the device 1000 may display a GUI for allowing a user to set a privacy level for each category and may set a privacy level for each category based on a user input through the GUI. For example, the device 1000 may set a privacy level of a category "movie" to "2," may set a privacy level of a category "sport" to "1," may set a privacy level of a category "game" to "3," and may set a privacy level of a category "advertisement" to "4," based on a user input through the GUI. Accordingly, a first device knowledge graph of the category "movie," a first device knowledge graph of the category "sport," a first device knowledge graph of the category "game," and a first device knowledge graph of the category "advertisement" may be generated at different privacy levels.

Figure 11:
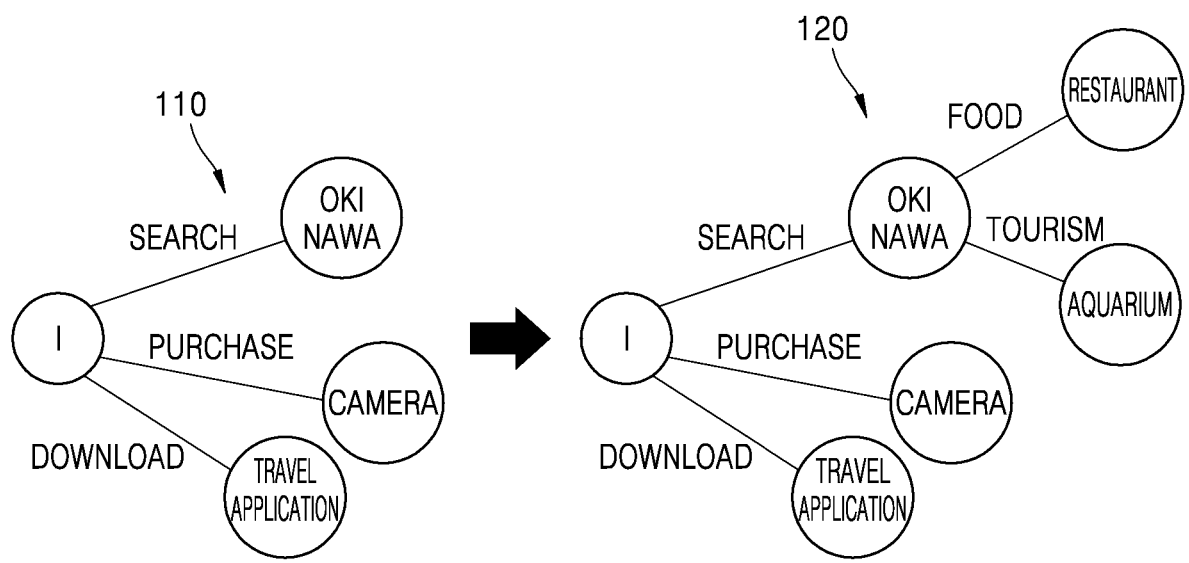
FIG. 11 is a diagram illustrating a first device knowledge graph and a second device knowledge graph, according to an embodiment.

FIG. 11 is a diagram illustrating a first device knowledge graph and a second device knowledge graph according to an embodiment.

Referring to FIG. 11, entities of a first device knowledge graph 110 may include "I," "Okinawa," "camera," and "travel application." Also, for example, a relation between the entity "I" and the entity "Okinawa" may be "search," a relation between the entity "I" and the entity "camera" may be "purchase," and a relation between the entity "I" and the entity "travel application" may be "download."

The device 1000 may generate a second device knowledge graph 120 by inputting the first device knowledge graph 110 and a server knowledge graph received from the server 2000 to a first AI model. The second device knowledge graph 120 may be a knowledge graph extended from the first device knowledge graph 110. The entities in the first device knowledge graph 110 and entities in the server knowledge graph may be mapped by certain criteria, and the entities in the server knowledge graph may be integrated with the entities in the first device knowledge graph 110 according to certain criteria. For example, the second device knowledge graph 120 may include entities "restaurant" and "aquarium" extended from the entity "Okinawa." Also, for example, a relation between the entity "Okinawa" and the entity "restaurant" may be determined to be "food," and a relation between the entity "Okinawa" and the entity "aquarium" may be determined to be "tourism."

Figure 12:
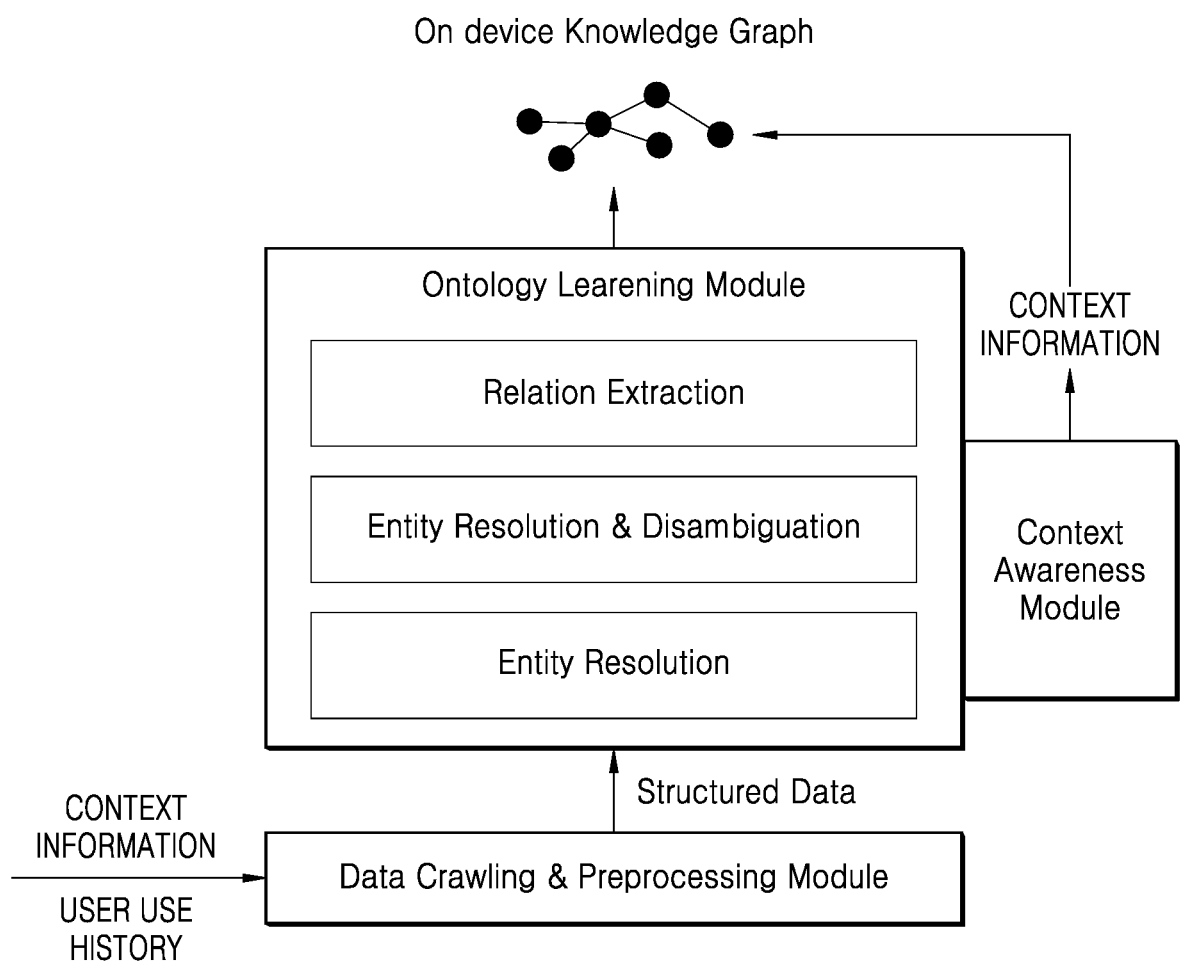
FIG. 12 is a diagram illustrating an example in which a device generates a first device knowledge graph by using a first AI model, according to an embodiment.

FIG. 12 is a diagram illustrating an example in which a device 1000 generates a first device knowledge graph by using a first AI model according to an embodiment.

Referring to FIG. 12, the device 1000 may generate structured data by collecting and preprocessing context information and may generate a first device knowledge graph by using the structured data. The structured data may be text indicating, for example, sequential operations and may be sentences indicating context related to the device 1000 and/or a user.

The device 1000 may input the structured data to a first AI model, and the first AI model may generate a first device graph through entity extraction, entity resolution and disambiguation (entity analysis and abstraction), and relation extraction by using the structured data as an input value. The first AI model may be implemented by using, for example, an ontology learning module and may be implemented by using a network including a plurality of layers.

Figure 13:
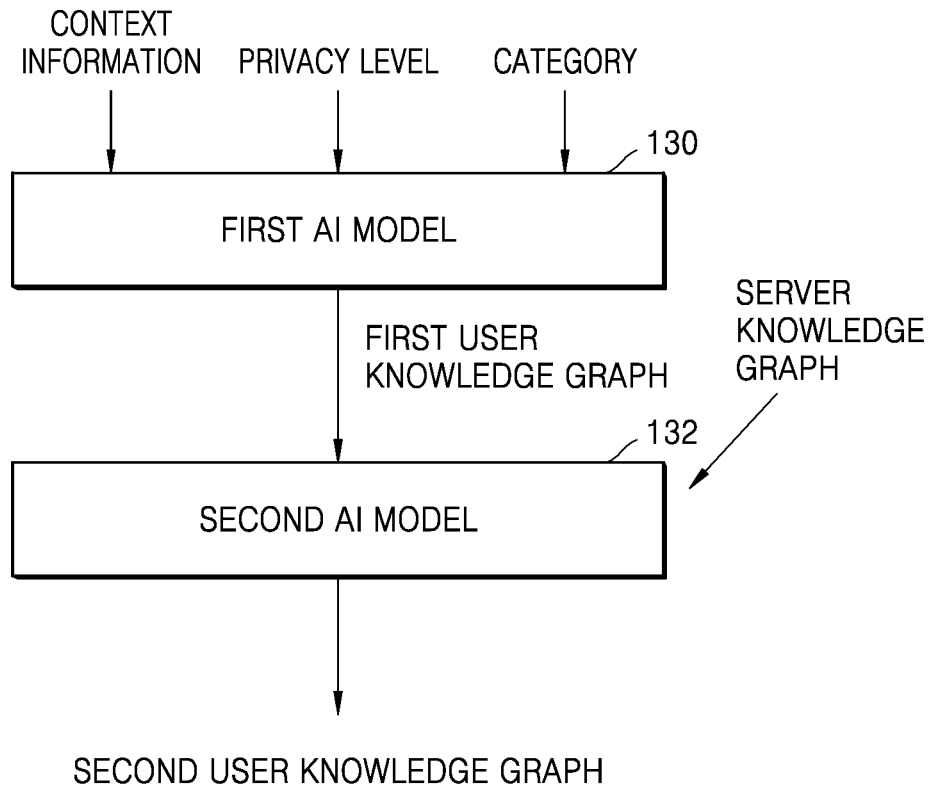
FIG. 13 is a diagram illustrating an example in which a device generates a first device knowledge graph and a second device knowledge graph by using a first AI model and a second AI model, according to an embodiment.

FIG. 13 is a diagram illustrating an example in which a device 1000 generates a first device knowledge graph and a second device knowledge graph by using a first AI model 130 and a second AI model 132 according to an embodiment.

Referring to FIG. 13, a first AI model 130 may receive context information, a privacy level, and a category and may output a first device knowledge graph. The context information may be processed into text indicating sequential operations and may be input to the first AI model 130. Also, the first AI model 130 may output the first device knowledge graph corresponding to the input category. Furthermore, data in the first device knowledge graph may be extracted to protect a user's privacy based on the input privacy level.

A second AI model 132 may receive the first device knowledge graph and a server knowledge graph and may output a second device knowledge graph. The server knowledge graph may be generated by a server based on big data from various devices. Also, the second AI model 132 may output the second device knowledge graph by extending the first device knowledge graph by using the server knowledge graph.

Figure 14:
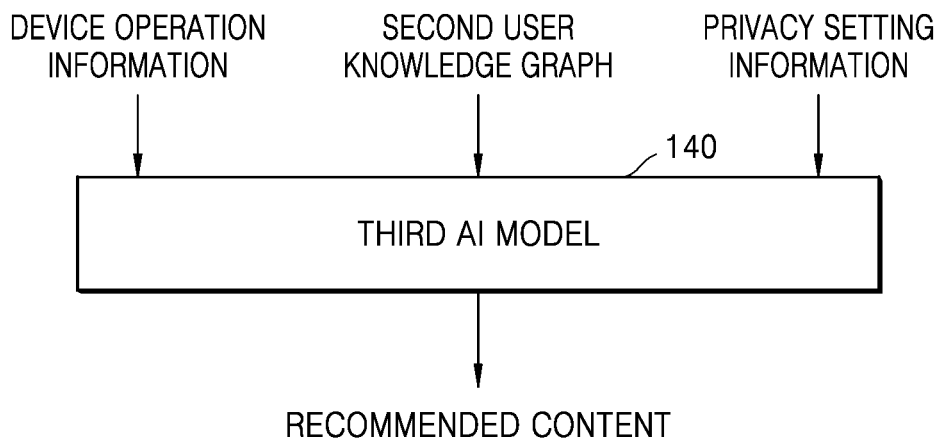
FIG. 14 is a diagram illustrating an example in which a device determines recommended content by using a third AI model, according to an embodiment.

FIG. 14 is a diagram illustrating an example in which a device 1000 determines recommended content by using a third AI model 140 according to an embodiment.

Referring to FIG. 14, a third AI model 140 may receive operation information of the device 1000, a second device knowledge graph, and privacy setting information and may determine recommended content. The operation information of the device 1000 may be collected in real time by the device 1000 and may be input to the third AI model 140. In this case, the operation information of the device 1000 may be preprocessed in a preset format. The third AI model 140 may determine recommended content to be recommended to a user based on the privacy setting information. The third AI model 140 may output, but is not limited to, an identification value of the recommended content. The third AI model 140 may output at least one of a type of the recommended content, a category, or link information. Also, the third AI model 140 may receive information about the category set by the user and may output the recommended content related to the category set by the user.

Figure 15:
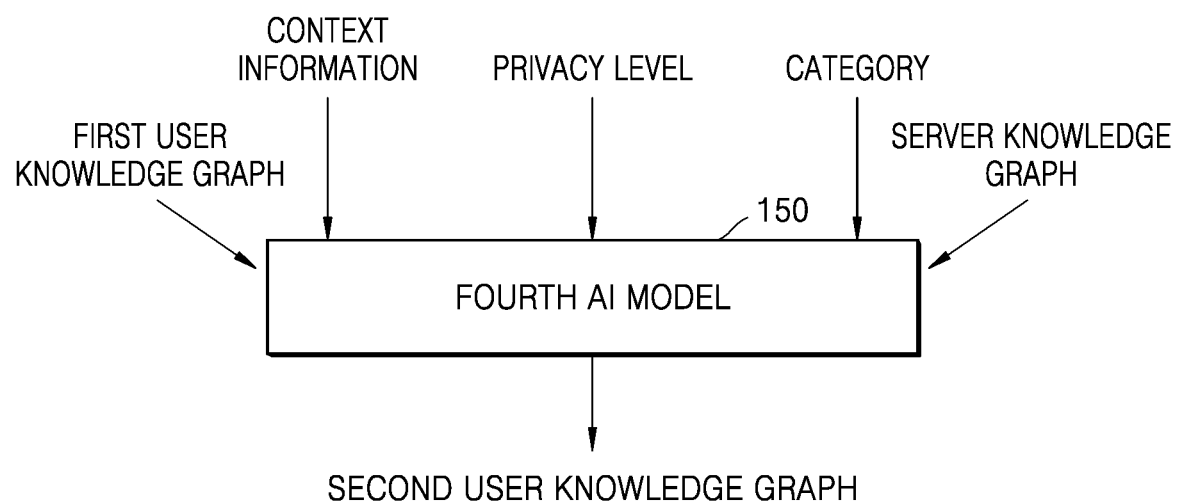
FIG. 15 is a diagram illustrating an example in which a device generates a second device knowledge graph by using a fourth AI model, according to an embodiment.

FIG. 15 is a diagram illustrating an example in which a device 1000 generates a second device knowledge graph by using a fourth AI model 150 according to an embodiment.

Referring to FIG. 15, a fourth AI model 150 may receive a first device knowledge graph, context information, a privacy level, a category, and a server knowledge graph and may output a second device knowledge graph. The fourth AI model 150 may be an AI model for extending and updating the first device knowledge graph. The fourth AI model 150 may be trained by using at least one of a machine learning algorithm, a neural network algorithm, a genetic algorithm, a deep learning algorithm, or a classification algorithm as an AI algorithm. The fourth AI model 150 may function to extend the first device knowledge graph by analyzing and integrating the first device knowledge graph and the server knowledge graph.

Figure 16:
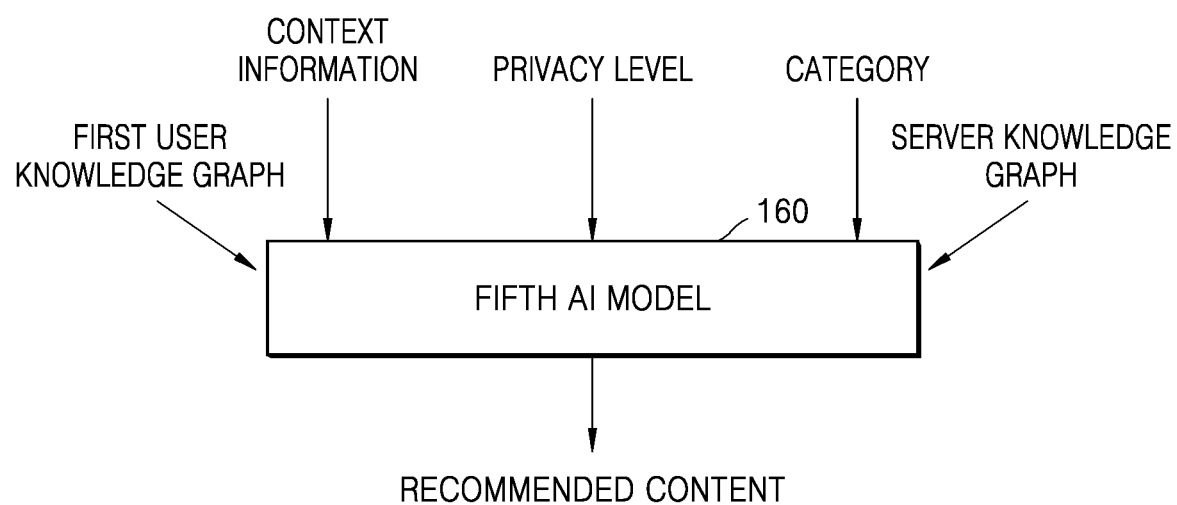
FIG. 16 is a diagram illustrating an example in which a device determines recommended content by using a fifth AI model, according to an embodiment.

FIG. 16 is a diagram illustrating an example in which a device 1000 determines recommended content by using a fifth AI model 160 according to an embodiment.

Referring to FIG. 16, a fifth AI model 160 may receive a first device knowledge graph, context information, a privacy level, a category, and a server knowledge graph and may output recommended content. In this case, the fifth AI model 160 may be an AI model for extending the first device knowledge graph by using the server knowledge graph and determining the recommended content. The fifth AI model 160 may be trained by using at least one of a machine learning algorithm, a neural network algorithm, a genetic algorithm, a deep learning algorithm, or a classification algorithm as an AI algorithm.

Figure 17:
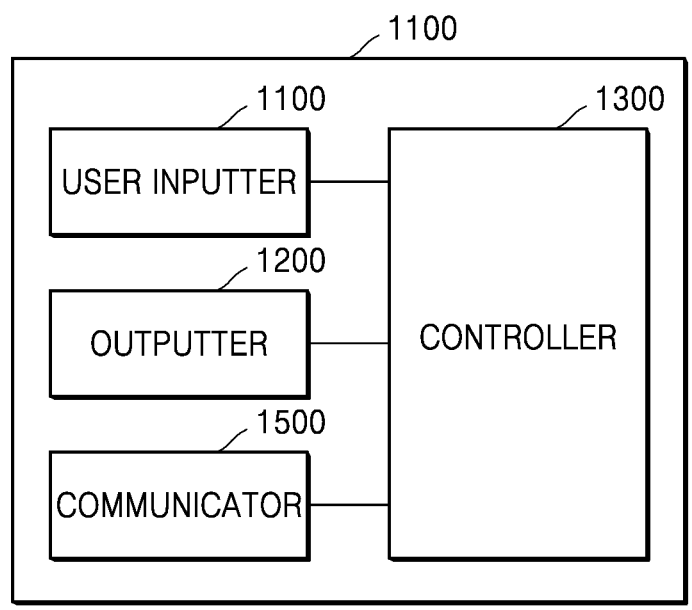
FIG. 17 is a block diagram of a device according to an embodiment.
Figure 18:
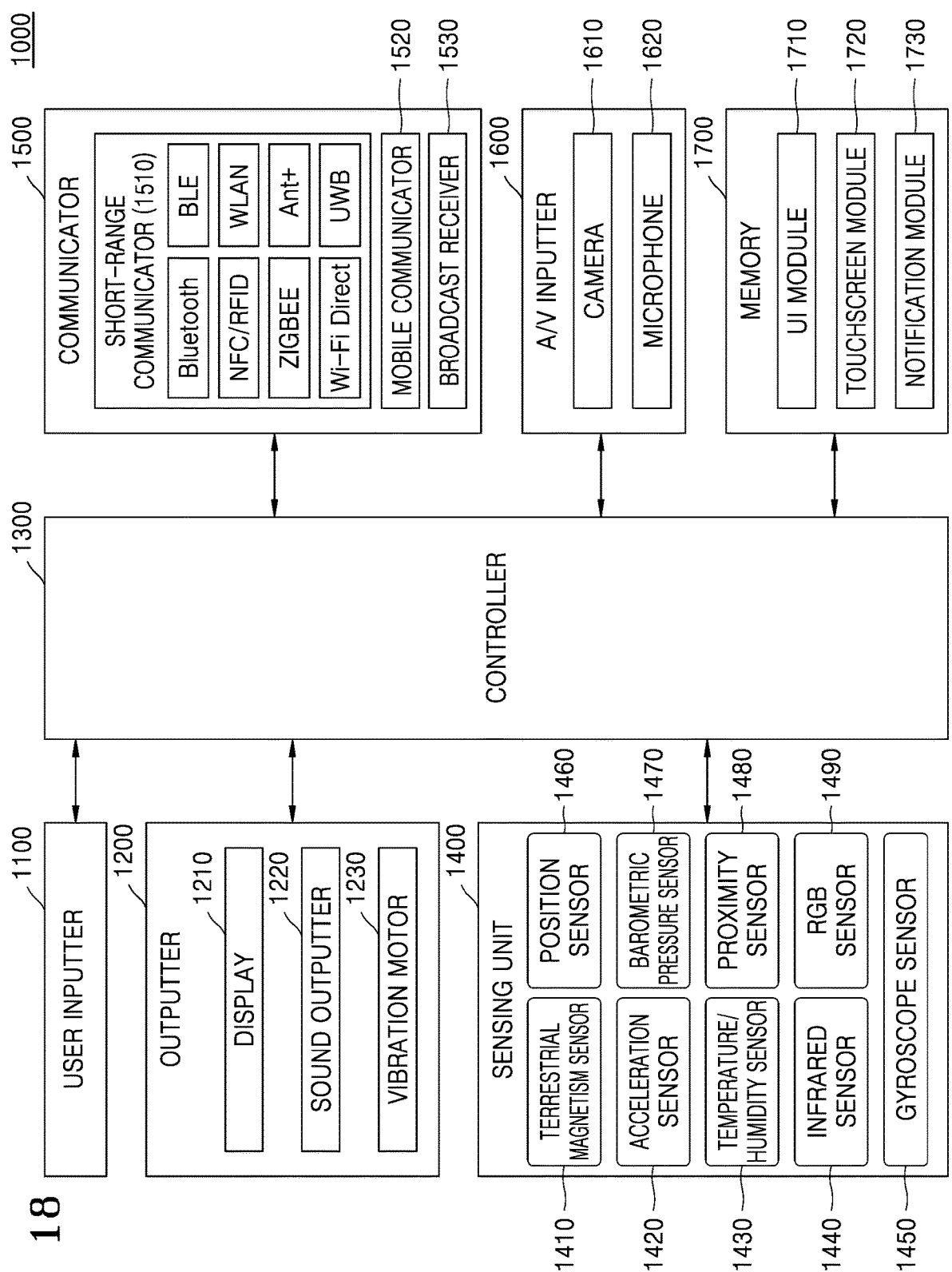
FIG. 18 is a block diagram of a device according to an embodiment.

FIGS. 17 and 18 are block diagrams of a device 1000 according to one or more embodiments.

As shown in FIG. 17, the device 1000 according to an embodiment may include a user inputter 1100, an outputter 1200, a controller 13000, and a communicator 1500. It is understood, however, that the device 1000 may include more or less elements than the elements illustrated in FIG. 17.

For example, as shown in FIG. 18, the device 1000 according to an embodiment may further include a sensing unit 1400 (e.g., sensor), an audio/video (NV) inputter 1600, and a memory 1700 in addition to the user inputter 1100, the outputter 1200, the controller 1300, and the communicator 1500.

The user inputter 1100 is a unit through which a user inputs data for controlling the device 1000. Examples of the user inputter 1100 may include, but are not limited to, at least one of a keypad, a dome switch, a touchpad (e.g., a contact-type capacitance method, a pressure-type resistance film method, an infrared sensing method, a surface ultrasound transmission method, an integral tension measuring method, or a piezoelectric effect method), a proximity sensor, a gesture sensor, a jog wheel, and a jug switch.

The user inputter 1100 may receive a user input for providing recommended content based on a device knowledge graph.

The outputter 1200 may output an audio signal, a video signal, or a vibration signal and may include a display 1210, a sound outputter 1220, and a vibration motor 1230.

The display 1210 displays and outputs information processed by the device 1000. For example, the display 1210 may display a user interface for providing the recommended content based on the device knowledge graph.

When the display 1210 and a touchpad have a layer structure to form a touchscreen, the display 1210 may be used as an input device as well as an output device.

The sound outputter 1220 outputs audio data received from the communicator 1500 or stored in the memory 1700. Also, the sound outputter 1220 outputs a sound signal (e.g., a call signal receiving sound, a message receiving sound, or a notification sound) related to a function performed by the device 1000. The sound outputter 1220 may include a speaker or a buzzer.

The vibration motor 1230 may output a vibration signal. For example, the vibration motor 1230 may output a vibration signal corresponding to an output of audio data or video data (e.g., a call signal receiving sound, a message receiving sound, or a notification sound). Also, the vibration motor 1230 may output a vibration signal when a touch is input to a touchscreen.

The controller 1300 (e.g., at least one processor) generally controls an overall operation of the device 1000. For example, the controller 1300 may control the user inputter 1100, the outputter 1200, the sensing unit 1400, the communicator 1500, and the AN inputter 1600 by executing programs or instructions stored in the memory 1700. The controller 1300 may control an operation of the device 1000 by controlling the user inputter 1100, the outputter 1200, the sensing unit 1400, the communicator 1500, and the AN inputter 1600.

In detail, the controller 1300 may obtain context information related to the device 1000. The controller 1300 may monitor an operation of an application in the device 1000 and may collect information related to the device 1000 from a sensor in the device 1000 and another device connected to the device 1000.

The controller 1300 may obtain a first device knowledge graph by inputting the context information to a first AI model. The controller 1300 may obtain the first device knowledge graph by processing the context information and inputting the processed context information to the first AI model. The controller 1300 may generate the first device knowledge graph for each of certain categories. The controller 1300 may generate the first device knowledge graph according to a privacy level for protecting the user's personal information.

The controller 1300 may request a server knowledge graph from the server 2000. The controller 1300 may request the server knowledge graph from the server 2000 by transmitting information related to the user's profile and an identification value of a category selected by the user to the server 2000.

The controller 1300 may receive the server knowledge graph from the server 2000. The controller 1300 may receive the server knowledge graph related to the user's profile. Furthermore, the controller 1300 may receive the server knowledge graph related to the category selected by the user.

The controller 1300 may obtain a second device knowledge graph by inputting the first device knowledge graph and the server knowledge graph to a second AI model. The second device knowledge graph may be a knowledge graph extended from the first device knowledge graph.

The controller 1300 may provide content based on the second device knowledge graph. The controller 1300 may identify a current context of the device 1000 and may determine content suitable for the current context as recommended content by using the second device knowledge graph. Also, the controller 1300 may request the determined recommended content from the content providing server 3000 and may receive the requested recommended content from the content providing server 3000.

The controller 1300 may process the context information into text indicating sequential operations. For example, the controller 1300 may generate sentences indicating context related to the device 1000 and/or the user based on the context information.

The controller 1300 may set a privacy level of a device knowledge graph. The controller 1300 may set the privacy level of the device knowledge graph, in order to abstract data related to the user's privacy among data in the device knowledge graph.

The controller 1300 may apply the text and the privacy level to the first AI model. The controller 1300 may abstract data related to individual privacy by inputting the text and the privacy level to the first AI model, and first user knowledge data based on the abstracted data may be output from the first AI model.

The controller 1300 may select at least one category for receiving user customized content in a category list. The controller 1300 may display a certain category list on a screen of the device 1000 and may receive a user input that selects a specific category in the certain category list.

The controller 1300 may set a privacy level for each selected category. The controller 1300 may display a GUI for inputting the privacy level on the screen of the device 1000 and may set the privacy level for each category based on a user input through the GUI. Accordingly, the privacy level may be differently set for each category, and the controller 1300 may generate the device knowledge graph for each category according to the differently set privacy level.

The controller 1300 may obtain operation information of the device 1000 in real time. The controller 1300 may obtain context related to the device 1000, such as an application that is being executed in the device 1000, a function of the application that is being executed, an ambient environment of the device 1000, and schedule information stored in the device 1000, as the operation information of the device 1000 in real time.

By applying the second device knowledge graph and the operation information of the device 1000 to a third AI model, the controller 1300 may determine recommended content to be provided to the user.

The controller 1300 may provide the determined recommended content to the user. The controller 1300 may identify the content providing server 3000 that provides the determined recommended content and may request the recommended content from the identified content providing server 3000. Also, the controller 1300 may receive the recommended content from the content providing server 3000. Accordingly, the controller 1300 may provide the recommended content suitable for the user to the user, without providing information related to the user's privacy to the content providing server 3000.

The sensing unit 1400 may detect a state of the device 1000 or a state around the device 1000, and may transmit detected information to the controller 1300.

The sensing unit 1400 may include at least one of, but not limited to, a terrestrial magnetism sensor 1410, an acceleration sensor 1420, a temperature/humidity sensor 1430, an infrared sensor 1440, a gyroscope sensor 1450, a position sensor (e.g., a global positioning system (GPS)) 1460, a barometric pressure sensor 1470, a proximity sensor 1480, or an RGB sensor (e.g., an illuminance sensor) 1490.

The communicator 1500 may include one or more elements (e.g., interfaces, circuitry, ports, etc.) through which the device 1000 communicates with the server 2000 and the content providing server 3000. For example, the communicator 1500 may include a short-range communicator 1510, a mobile communicator 1520, and a broadcast receiver 1530.

Examples of the short-range communicator 1510 may include, but are not limited to, a Bluetooth communicator, a Bluetooth low energy (BLE) communicator, a near-field communicator, a WLAN (Wi-Fi) communicator, a Zigbee communicator, an infrared data association (IrDA) communicator, a Wi-Fi Direct (WFD) communicator, an ultra-wideband (UWB) communicator, and an Ant+ communicator.

The mobile communicator 1520 transmits/receives a wireless signal to/from at least one of a base station, an external terminal, or a server via a mobile communication network. Examples of the wireless signal may include a voice call signal, a video call signal, and any of various pieces of data according to text/multimedia message transmission/reception.

The broadcast receiver 1530 receives a broadcast signal and/or broadcast-related information from the outside through a broadcast channel. Examples of the broadcast channel may include a satellite channel and a terrestrial channel. According to an embodiment, the device 1000 may not include the broadcast receiver 1530.

Also, the communicator 1500 may transmit/receive information used to provide the recommended content based on the device knowledge graph to/from the server 2000 and the content providing server 3000.

The AN inputter 1600 for inputting an audio signal or a video signal may include a camera 1610 and a microphone 1620. The camera 1610 may obtain image frames such as a still image or a moving image by using an image sensor in a video call mode or an imaging mode. An image captured by the image sensor may be processed by the controller 1300 or an additional image processor.

The image frames processed by the camera 16140 may be stored in the memory 1700 or may be transmitted to the outside through the communicator 1500. Two or more cameras 1610 may be provided according to a configuration of a terminal.

The microphone 1620 receives an external sound signal and processes the external sound signal into electrical voice data. For example, the microphone 1620 may receive a sound signal from an external device or a speaker. The microphone 1620 may use any of various noise removing algorithms to remove noise occurring when (e.g., based on) receiving the external sound signal.

The memory 1700 may store a program or instructions for processing and controlling the controller 1300 and may store data input to the device 1000 or output from the device 1000.

The memory 1700 may include at least one type of storage medium from among a flash memory type, a hard disk type, a multimedia card micro type, a card-type memory (e.g., a secure digital (SD) or XD memory), a random-access memory (RAM), a static RAM (SRAM), a read-only memory (ROM), an electrically erasable programmable ROM (EEPROM), a programmable FROM (PROM), a magnetic memory, a magnetic disk, or an optical disk.

The memory 1700 may store the first device knowledge graph and the second device knowledge graph. The memory 1700 may build a database of the first device knowledge graph for each category and may store the first device knowledge graph. The memory 1700 may build a database of the first device knowledge graph for each privacy level and may store the first device knowledge graph.

Also, the memory 1700 may build a database of the second device knowledge graph for each category and may store the second device knowledge graph. The memory 1700 may build a database of the second device knowledge graph for each privacy level and may store the second device knowledge graph.

Programs stored in the memory 1700 may be classified into a plurality of modules, for example, into a user interface (UI) module 1710, a touchscreen module 1720, and a notification module 1730, according to functions of the memory 1700.

The UI module 1710 may provide a specialized UI or a GUI that interoperates with the device 1000 for each application. The touchscreen module 1720 may detect a touch gesture of the user on a touchscreen and may transmit information about the touch gesture to the controller 1300. The touchscreen module 1720 according to an embodiment may recognize and analyze a touch code. The touchscreen module 1720 may be configured as separate hardware including a controller.

Various sensors may be located in or near the touchscreen in order to detect a touch or a proximity touch of the touchscreen. An example of a sensor for detecting a touch of the touchscreen may be a tactile sensor The tactile sensor refers to a sensor that detects a contact of a specific object to a degree that a person feels or a higher degree. The tactile sensor may detect any of various information such as a roughness of a contact surface, a rigidity of a contact object, or a temperature of a contact point.

Also, an example of a sensor for detecting a touch of the touchscreen may be a proximity sensor.

The proximity sensor refers to a sensor that detects an object that is approaching a certain detection surface or a neighboring object by using the strength of an electromagnetic field or infrared rays without a mechanical contact. Examples of the touch gesture of the user may include a tap, a touch and hold, a double-tab, a drag, a panning, a flick, a drag and drop, and a swipe.

The notification module 1730 may generate a signal for notifying an event occurring in the device 1000. The notification module 1730 may output a notification signal as a video signal through the display 1210, may output a notification signal as an audio signal through the sound outputter 1220, or may output a notification signal as a vibration signal through the vibration motor 1230.

Figure 19:
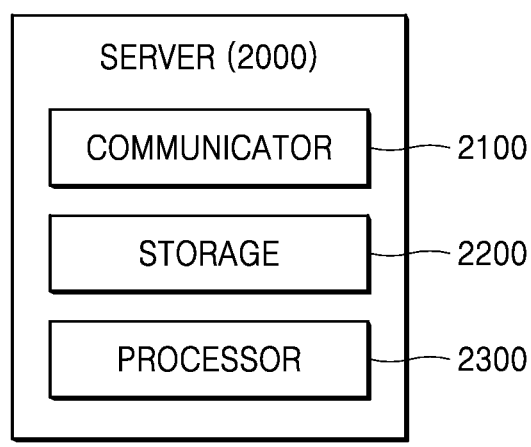
FIG. 19 is a block diagram of a server according to an embodiment.

FIG. 19 is a block diagram of a server 2000 according to an embodiment.

Referring to FIG. 19, the server 2000 according to an embodiment may include a communicator 2100, a storage 2200, and a processor 2300.

The communicator 2100 may include one or more elements for communicating with the device 1000 and the content providing server 3000. For example, the communicator 2100 may include a short-range communicator, a mobile communicator, and a broadcast receiver. Also, the communicator 2100 may transmit information used to provide recommended content based on a device knowledge graph to/from the device 1000 and the content providing server 3000.

The storage 2200 may store a program or instructions for processing and controlling the processor 2300 and may store data input to the server 2000 or output from the server 2000. Also, the storage 2200 may store a server knowledge graph. The storage 2200 may build a database of the server knowledge graph for each category and may store the server knowledge graph.

The processor 2300 (e.g., at least one processor) may generally control an overall operation of the server 2000. For example, the processor 2300 may control the communicator 2100 and the storage 2200 by executing programs or instructions stored in the storage 2200. The processor 2300 may control an operation of the server 2000 by controlling the communicator 2100 and the storage 2200.

In detail, the processor 2300 may generate the server knowledge graph. The processor 2300 may collect various kinds of big data from various devices and may generate the server knowledge graph by using the collected big data. The big data collected by the processor 2300 may be data abstracted from individual privacy information.

The processor 2300 may receive a request for the server knowledge graph from the device 1000. The processor 2300 may receive information about a user's profile and/or a category value from the device 1000. In this case, information about the user's privacy in the information about the user's profile may be abstracted information.

The processor 2300 may provide the server knowledge graph to the device 1000. The processor 2300 may extract the server knowledge graph to be provided to the device 1000 from the storage 2200 in consideration of the user's profile and/or a category and may provide the extracted server knowledge graph to the device 1000. In this case, the server knowledge graph may be generated according to the user's profile and the category and may be stored in the storage 2200.

The processor 2300 may receive the device knowledge graph from which privacy information is removed from the device 1000. The processor 2300 may update the server knowledge graph by using the device knowledge graph from which the privacy information is removed. The processor 2300 may update the server knowledge graph by inputting the server knowledge graph and the device knowledge graph to a certain AI model. The updated server knowledge graph may later be used by the device 1000 to generate a second device knowledge graph.

An AI-related function according to embodiments is performed through a processor and a memory. The processor may include at least one processor. In this case, the at least one processor may include a general-purpose processor such as a central processing unit (CPU), an access point (AP), or a digital signal processor (DSP), a graphics processor such as a graphics processing unit (GPU) or a vision processing unit (VPU), or an AI processor such as a neural processing unit (NPU). The at least one processor controls input data to be processed according to a predefined operation rule or AI model stored in a memory. Alternatively, when the at least one processor is an AI processor, the AI processor may be designed to have a hardware structure specialized to process a specific AI model.

The predefined operation rule or AI model is created through learning. When the predefined operation rule or AI model is created through learning, it means that the predefined operation rule or AI model set to achieve desired characteristics (or purposes) is created when a basic AI model is trained using a plurality of training data by using a learning algorithm. The learning may be performed by a device itself in which AI according to embodiments is used, or may be performed through a separate server and/or system. Examples of the learning algorithm may include, but are not limited to, supervised learning, unsupervised learning, semi-supervised learning, or reinforcement learning.

The AI mode may include a plurality of neural network layers. The plurality of neural network layers have a plurality of weight values, and each perform a neural network operation through computation among the plurality of weight values and a computation result of a previous layer. The plurality of weight values of the plurality of neural network layers may be optimized by a training result of the AI model. For example, during a learning process, the plurality of weight values may be updated to reduce or minimize a loss value or a cost value obtained by the AI model. An artificial neural network may include a deep neural network (DNN), and examples of the artificial neural network may include, but are not limited to, a convolutional neural network (CNN), a DNN, a recurrent neural network (RNN), a restricted Boltzmann machine (RBM), a deep belief network (DBN), a bidirectional recurrent deep neural network (BRDNN), and a deep Q-network.

Also, a first AI model may be generated by learning criteria for generating a first device knowledge graph. The first AI model may be generated by learning criteria for determining which data is to be generated or used to generate the first device knowledge graph and how to generate the first device knowledge graph by using the data.

Also, a second AI model may be generated by learning criteria for generating a second device knowledge graph. The second AI model may be generated by learning criteria for determining which data is to be used to generate the second device knowledge graph and how to generate the second device knowledge graph by using the data.

Also, a third AI model may be generated by learning criteria for determining recommended content. The third AI model may be generated by learning criteria for determining which data is to be used to determine the recommended content and how to determine the recommended content by using the data.

The first AI model may output the first device knowledge graph by using certain data according to preset criteria as an input value. A resultant value output by the first AI model using the obtained data as an input value may be used to update the first AI model.

Also, the second AI model may output the second device knowledge graph by using certain data according to preset criteria as an input value. A resultant value output by a second AI model using the obtained data as an input value may be used to update the second AI model.

Furthermore, the third AI model may determine the recommended content by using certain data according to preset criteria as an input value. A resultant value output by the third AI model using the obtained data as an input value may be used to update the third AI model.

One or more embodiments may be implemented as a recording medium including computer-executable instructions such as a program module executed by a computer. A computer-readable medium may be an arbitrary available medium accessible by a computer, and examples thereof include all volatile and non-volatile media and separable and non-separable media. Further, examples of the computer-readable medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, or other data. The communication medium generally includes computer-readable instructions, data structures, program modules, or other data of a modulated data signal.

Also, the term "unit" used herein may be a hardware component such as a processor or a circuit and/or a software component executed in a hardware component such as a processor.

While the disclosure has been particularly shown and described with reference to embodiments thereof, it will be understood by one of ordinary skill in the art that various changes in form and details may be made therein without departing from the spirit and scope of the disclosure as defined at least by the following claims. Hence, it will be understood that the embodiments described above are not limiting of the scope of the disclosure. For example, each component described in a single type may be executed in a distributed manner, and components described distributed may also be executed in an integrated form.

The scope of the disclosure is indicated by at least the claims rather than by the detailed description, and it should be understood that the claims and all modifications or modified forms drawn from the concept of the claims are included in the scope of the disclosure.

What is claimed is:

1. A device for providing content based on a knowledge graph, the device comprising:
  a communication interface;
  a memory storing one or more instructions; and
  a processor configured to execute the one or more instructions to:
    obtain context information related to the device;
    generate, using the device, a first device knowledge graph of a user of the device by inputting the obtained context information to a first artificial intelligence (AI) model for determining a relation between entities related to the user of the device;
    control to request, from a server, a server knowledge graph generated by the server;
    control to receive the server knowledge graph from the server;
    generate, using the device, a second device knowledge graph of the user by inputting the generated first device knowledge graph and the received server knowledge graph to a second AI model for extending the first device knowledge graph on the device; and
    provide content based on the generated second device knowledge graph,
  wherein the context information includes at least one information related to privacy of the user, the at least one information related to the privacy of the user is not transmitted outside of the device, and the server knowledge graph is generated without using any information related to the privacy of the user,
  wherein each of the first AI model and the second AI model is an AI model trained by using, as an AI algorithm, a neural network algorithm in which a plurality of neural network layers have a plurality of weight values, wherein the plurality of weight values of the plurality of neural network layers are applied to the input context information and a computation result of a previous layer to determine the relation between entities related to the user of the device, and wherein the plurality of weight values are updated based on the determined relation between entities to reduce a loss value obtained by the AI model to optimize a training result of the AI model, wherein the server knowledge graph is generated by the server based on big data provided to the server by the device and at least one other device, wherein the processor is further configured to execute the one or more instructions to determine a privacy level for the first device knowledge graph and input the determined privacy level to the first AI model, wherein a part of data in the first device knowledge graph output from the first AI model comprises data abstracted according to the privacy level, wherein based on the privacy level being a first privacy level, the data includes a reference to a specific name, and based on the privacy level being a second privacy level, the data is abstracted to refer to a general name and not the specific name, and wherein the second AI model extends the first device knowledge graph by analyzing and integrating the first device knowledge graph and the server knowledge graph.

2. The device of claim 1, wherein the processor is further configured to execute the one or more instructions to process the context information into text indicating sequential operations and input the text into the first AI model.

3. The device of claim 1, wherein:
the processor is further configured to execute the one or more instructions to input a category to the first AI model; and
the first device knowledge graph corresponding to the input category is output from the first AI model.

4. The device of claim 1, wherein the first AI model outputs the first device knowledge graph through at least one of entity extraction, entity analysis and abstraction, and relation extraction.

5. The device of claim 1, wherein the processor is further configured to execute the one or more instructions to:
control to transmit, to the server, information about a user profile of the user; and
control to receive, from the server, the server knowledge graph related to the user profile.

6. The device of claim 1, wherein the processor is further configured to execute the one or more instructions to control to transmit a certain category to the server and to receive, from the server, the server knowledge graph corresponding to the certain category.

7. The device of claim 1, wherein the processor is further configured to execute the one or more instructions to:
determine content to be recommended to the user by inputting, to a third AI model, operation information of the device and the second device knowledge graph; and
control request a content providing server for the determined content to be recommended.

8. A method, performed by a device, of providing content based on a knowledge graph, the method comprising:
obtaining context information related to the device;
generating, using the device, a first device knowledge graph of a user of the device by inputting the obtained context information to a first artificial intelligence (AI) model for determining a relation between entities related to the user of the device;
requesting, from a server, a server knowledge graph generated by the server;
receiving, from the server, the server knowledge graph;
generating, using the device, a second device knowledge graph of the user by inputting the generated first device knowledge graph and the received server knowledge graph to a second AI model for extending the first device knowledge graph on the device; and
providing content based on the generated second device knowledge graph, wherein the context information includes at least one information related to privacy of the user, the at least one information related to the privacy of the user is not transmitted outside of the device, and the server knowledge graph is generated without using any information related to the privacy of the user, and wherein each of the first AI model and the second AI model is an AI model trained by using, as an AI algorithm, a neural network algorithm in which a plurality of neural network layers have a plurality of weight values, wherein the plurality of weight values of the plurality of neural network layers are applied to the input context information and a computation result of a previous layer to determine the relation between entities related to the user of the device, and wherein the plurality of weight values are updated based on the determined relation between entities to reduce a loss value obtained by the AI model to optimize a training result of the AI model, wherein the server knowledge graph is generated by the server based on big data provided to the server by the device and at least one other device, wherein the method further comprises determining a privacy level for the first device knowledge graph, wherein the generating the first device knowledge graph comprises inputting the privacy level to the first AI model, wherein part of data in the first device knowledge graph output from the first AI model comprises data abstracted according to the privacy level, wherein based on the privacy level being a first privacy level, the data includes a reference to a specific name, and based on the privacy level being a second privacy level, the data is abstracted to refer to a general name and not the specific name, and wherein the second AI model extends the first device knowledge graph by analyzing and integrating the first device knowledge graph and the server knowledge graph.

9. The method of claim 8, further comprising:
processing the context information into text indicating sequential operations,
wherein the generating the first device knowledge graph comprises inputting the text to the first AI model.

10. The method of claim 8, wherein:
the generating the first device knowledge graph comprises inputting a category to the first AI model; and
the first device knowledge graph corresponding to the input category is output from the first AI model.

11. The method of claim 8, wherein the first AI model outputs the first device knowledge graph through at least one of entity extraction, entity analysis and abstraction, and relation extraction.

12. The method of claim 8, wherein:
the requesting the server knowledge graph from the server comprises transmitting, to the server, information about a user profile of the user; and
the receiving the server knowledge graph comprises receiving, from the server, the server knowledge graph related to the user profile.

13. The method of claim 8, wherein:
the requesting the server knowledge graph from the server comprises transmitting a certain category to the server; and the receiving the server knowledge graph comprises receiving, from the server, the server knowledge graph corresponding to the certain category.

14. A non-transitory computer-readable recording medium having recorded thereon a program executable by at least one processor to perform:

obtaining context information related to a device;

generating, using the device, a first device knowledge graph of a user of the device by inputting the obtained context information to a first artificial intelligence (AI) model for determining a relation between entities related to the user of the device;

requesting, from a server, a server knowledge graph generated by the server;

receiving, from the server, the server knowledge graph;

generating, using the device, a second device knowledge graph of the user by inputting the generated first device knowledge graph and the received server knowledge graph to a second AI model for extending the first device knowledge graph on the device; and providing content based on the generated second device knowledge graph, wherein the context information includes at least one information related to privacy of the user, the at least one information related to the privacy of the user is not transmitted outside of the device, and the server knowledge graph is generated without using any information related to the privacy of the user, wherein each of the first AI model and the second AI model is an AI model trained by using, as an AI algorithm, a neural network algorithm in which a plurality of neural network layers have a plurality of weight values, wherein the plurality of weight values of the plurality of neural network layers are applied to the input context information and a computation result of a previous layer to determine the relation between entities related to the user of the device, and the plurality of weight values are updated based on the determined relation between entities to reduce a loss value obtained by the AI model to optimize a training result of the AI model, and wherein the server knowledge graph is generated by the server based on big data provided to the server by the device and at least one other device, wherein the program is executable by the at least one processor to perform determining a privacy level for the first device knowledge graph, wherein the generating the first device knowledge graph comprises inputting the privacy level to the first AI model, wherein part of data in the first device knowledge graph output from the first AI model comprises data abstracted according to the privacy level, wherein based on the privacy level being a first privacy level, the data includes a reference to a specific name, and based on the privacy level being a second privacy level, the data is abstracted to refer to a general name and not the specific name, and wherein the second AI model extends the first device knowledge graph by analyzing and integrating the first device knowledge graph and the server knowledge graph.

* * * * *